United States Patent [19]

Ito et al.

[11] Patent Number: 5,371,630
[45] Date of Patent: Dec. 6, 1994

[54] ZOOM LENS SYSTEM

[75] Inventors: Takayuki Ito; Yasuyuki Sugano, both of Tokyo, Japan

[73] Assignees: Asahi Kogaku Kabushiki Kaisha; Asahi Seimitsu Kabushiki Kaisha, both of Tokyo, Japan

[21] Appl. No.: 917,314

[22] Filed: Jul. 23, 1992

[30] Foreign Application Priority Data

Jul. 23, 1991 [JP] Japan .................................. 3-273023
Aug. 15, 1991 [JP] Japan .................................. 3-205246

[51] Int. Cl.$^5$ .............................................. G02B 15/14
[52] U.S. Cl. ..................................... 359/688; 359/684
[58] Field of Search ............... 359/688, 739, 740, 765, 359/775, 776, 683, 684

[56] References Cited

U.S. PATENT DOCUMENTS

| | | | |
|---|---|---|---|
| 4,618,219 | 10/1986 | Sugiura et al. | 359/688 |
| 4,629,293 | 12/1986 | Mihara | 359/688 |
| 4,634,237 | 1/1987 | Aono et al. | 359/688 |
| 4,812,024 | 3/1989 | Mukaiya | 359/683 |
| 4,820,028 | 4/1989 | Suda et al. | 359/676 |
| 4,824,226 | 4/1989 | Tanaka | 359/683 |
| 5,204,779 | 4/1993 | Nakata et al. | 359/688 |

FOREIGN PATENT DOCUMENTS

| | | | |
|---|---|---|---|
| 60-11812 | 1/1985 | Japan | 359/776 |
| 2-165113 | 6/1990 | Japan | 359/688 |
| 1323851 | 7/1987 | U.S.S.R. | 359/776 |
| 1327039 | 7/1987 | U.S.S.R. | 359/776 |

Primary Examiner—William L. Sikes
Assistant Examiner—David R. Parsons
Attorney, Agent, or Firm—Sughrue, Mion, Zinn, Macpeak & Seas

[57] ABSTRACT

A zoom lens system includes, in order from the object side, a first lens unit that remains fixed during zooming and which has a positive power, a second lens unit that has a zooming capability, that moves during zooming and that has a negative power, a third lens unit that has a capability of compensating for the position of the focal point, that moves during zooming and that has a negative power, and a fourth lens unit that has an imaging capability, that remains fixed during zooming and that has a positive power, said fourth lens unit comprising a first sub-unit that comprises, in order from the object side, a positive lens element, a positive lens element and a negative lens element and that has a positive overall power, and a second sub-unit that comprises, in order from the object side, a positive lens element, a negative lens element and a positive lens element and that has a positive overall power. The zoom lens system satisfies the specified conditions.

11 Claims, 16 Drawing Sheets

| SPHERICAL ABERRATION SINE CONDITION | SPHERICAL ABERRATION CHROMATIC ABERRATION | ASTIGMATISM | DISTORTION |

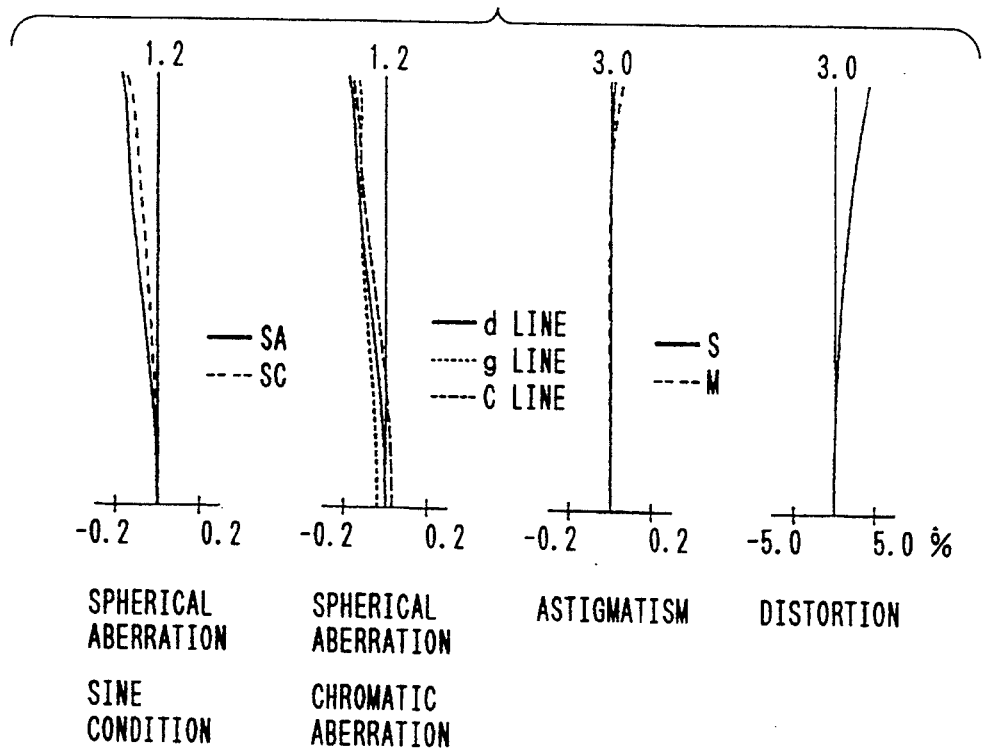
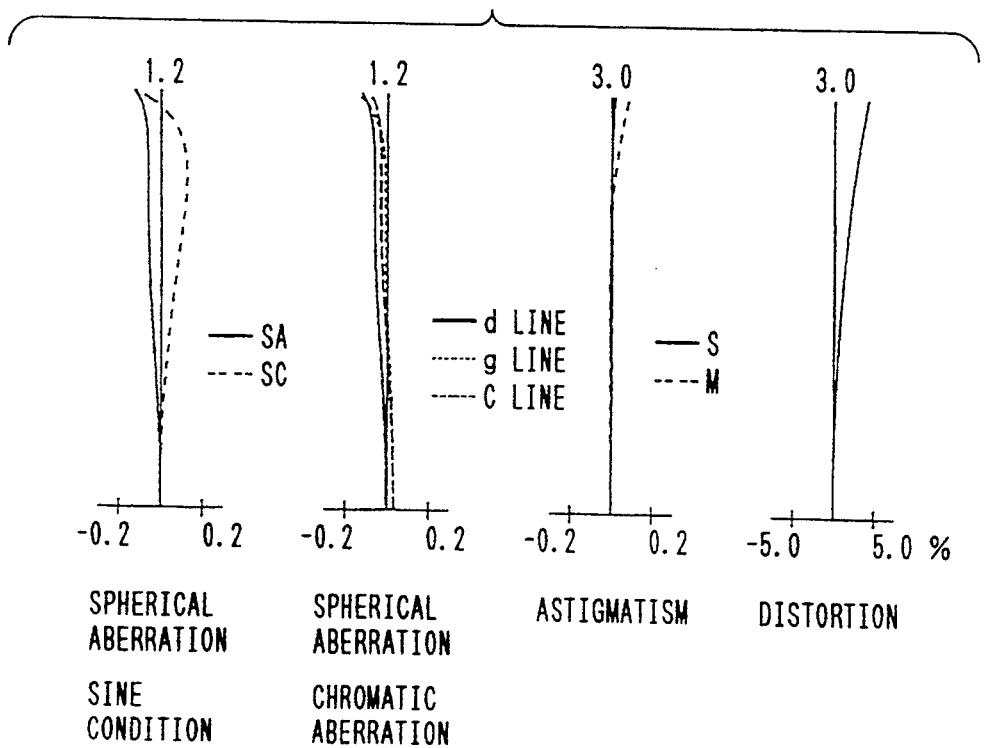

ZOOM LENS SYSTEM

BACKGROUND OF THE INVENTION

The application is based upon and claims priorities from Japanese Application Nos. HEI 3-273023 filed Jul. 23, 1991, and HEI 3-205246 filed Aug. 15, 1991, the disclosure of which is incorporated by reference herein.

The present invention relates to a zoom lens system suitable for use with a small television camera such as a CCTV camera. More particularly, the present invention relates to a zoom lens system of this type that is capable of focus adjustment. The present invention also relates to a zoom lens system with a zoom ratio of 6 to 12 that is suitable for use with a small television camera such as a CCTV camera.

One of the requirements to be satisfied by small television cameras of the type contemplated by the present invention is to use a compact and high-resolution imaging device. To meet this requirement, a taking lens system with a small F number is needed.

If the F number of a lens system is reduced, its depth of focus decreases to such an extent that errors in mounting the imaging device will sometimes become greater than the depth of focus of that lens system. In this case, focus adjustment is necessary after mounting the imaging device.

It often occurs that the same lens system is used with different kinds of television camera and, depending on the specific kind of camera, filters such as a faceplate, an IR cutoff filter and a low-pass filter may or may not be provided in front of the image plane or their thickness will vary and, as a result, the focus of the lens system must be adjusted in accordance with the thickness of the filter used. In conventional television cameras, focus adjustment is performed for an individual camera by moving the lens system as a whole when it is mounted in the camera.

However, this conventional method of adjustment has the problem that when a lens system of interest is to be mounted in different kinds of television cameras aberrations occur due to the different thicknesses of filters, making it difficult for the lens system to exhibit its performance fully. An other requirement to be satisfied by small television cameras of the type contemplated by the present invention is to make the overall size compact enough to be compatible with the smallness of imaging devices they use. Further, in order to insure adequate space for electrical parts such as an electric motor and a diaphragm stop unit, the zoom lens system is desirably rendered as compact as possible.

However, heretofore known four-group zoom lens systems with an aperture ratio of 1:1.2 and zoom ratios of ca. 6 to 12 are disadvantageous in that the fourth lens group is composed of at least 7 lens elements or that its overall length is too great.

In addition, conventional zoom lens systems have a diaphragm stop provided between the third and the fourth lens groups or within the fourth lens group at a position comparatively close to the object and, hence, the diameter of a light beam passing through the diaphragm stop is large enough to require a bulky stop mechanism.

SUMMARY OF THE INVENTION

The present invention has been accomplished under these circumstances and has as an object providing a zoom lens system that permits easy focus adjustment even if great errors occur in mounting an imaging device or that allows focus to be easily adjusted in accordance with the thickness of filters to be used, whereby the deterioration of aberrations can be suppressed.

This object of the present invention can be attained by a zoom lens system comprising, in order from the object side, a first lens group that remains fixed during zooming and which has a positive power, a second lens group that has a zooming capability, that moves during zooming and that has a negative power, a third lens group that has a capability of compensating for the position of the focal point, that moves during zooming and that has a negative power, and a fourth lens group that has an imaging capability, that remains fixed during zooming and that has a positive power, said fourth lens group comprising, in order from the object side, a sub-group 4a having a positive power and a sub-group 4b having a positive power, which zoom lens system adjusts the focus by moving said sub-group 4b along the optical axis and satisfies the following conditions:

$$0.20 < m < 0.70 \tag{1}$$

$$0.40 < f4a/f4b < 0.79 \tag{2}$$

where m: the lateral magnification of the sub-group 4b;
f4a: the focal length of the sub-group 4a; and
f4b: the focal length of the sub-group 4b.

In addition to the condition for $0.20 < m < 0.70$, the zoom lens system of the present invention preferably satisfies the following condition:

$$1.00 < \Sigma I4b < 5.00 \tag{3}$$

where $\Sigma I4b$ is the sum of the spherical aberration coefficients of the sub-group 4b.

The present invention provides as another object a compact four-group zoom lens system that uses a smaller number of lens elements in the fourth lens group and that permits a diaphragm stop to be located closer to the image plane than in the prior art.

This object of the present invention can be attained by a zoom lens system comprising, in order from the object side, a first lens group that remains fixed during zooming and which has a positive power, a second lens group that has a zooming capability, that moves during zooming and that has a negative power, a third lens group that has a capability of compensating for the position of the focal point, that moves during zooming and that has a negative power, and a fourth lens group that has an imaging capability, that remains fixed during zooming and that has a positive power, said fourth lens group comprising a first sub-group 4a that comprises, in order from the object side, a positive lens element, a positive lens element and a negative lens element and that has a positive overall power, and a second sub-group 4b that comprises, in order from the object side, a positive lens element, a negative lens element and a positive lens element and that has a positive overall power, which zoom lens system satisfies the following conditions:

$$0.8 < fM/f4 < 1.4 \tag{6}$$

$$0.75 < f4/f4a < 1.35 \tag{7}$$

$$0.4 < f4a/f4b < 0.79 \tag{2}$$

$$1.715 < N4ap \tag{8}$$

$$0.4 < L4a/fM < 0.65 \tag{9}$$

where $$fM = \sqrt{(fw \cdot ft)} \;;$$

fw: the focal length of the overall system at the wide-angle end;
ft: the focal length of the overall system at the telephoto end;
f4: the focal length of the fourth lens group;
N4ap: the average refractive index of the positive lens elements in the sub-group 4a; and
L4a: the overall length of the sub-group 4a.

BRIEF DESCRIPTION OF THE DRAWINGS

In the accompanying drawings:

FIG. 7 is a set of graphs plotting the aberration curves obtained with the zoom lens system of FIG. 5 at the middle-angle end;

FIG. 8 is a set of graphs plotting the aberration curves obtained with the zoom lens system of FIG. 5 at the telephoto end;

DESCRIPTION OF THE PREFERRED EMBODIMENTS

Figure 1:
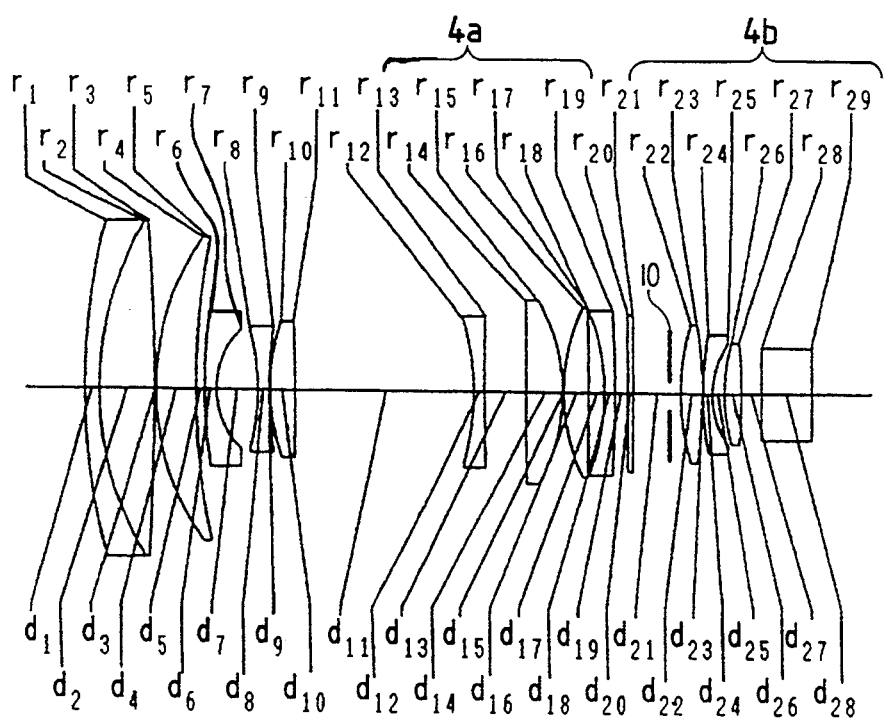
FIG. 1 is a simplified cross-sectional view showing the zoom lens system of Example 1 at the wide-angle end.

Several examples of the present invention are described below with reference to the accompanying drawings.

Each of the zoom lens systems according to the examples have four groups arranged in the order of a positive group, a negative group, a negative group and a positive group. The first lens group comprises, in order from the object side, a cemented lens composed of a negative lens element that is cemented to a positive meniscus lens element having a convex surface directed toward the object, and a positive meniscus lens element having a convex surface directed toward the object.

The second lens group comprises, in order from the object side, a negative meniscus lens element having a convex surface of small radius of curvature directed toward the object, a biconcave lens element, and a positive lens element spaced from this biconcave lens element by a small distance.

The third lens group is composed of a negative lens element having a concave surface of small radius of curvature directed toward the object.

The fourth lens group comprises the first sub-group 4a that comprises, in order from the object side, a positive lens element, a positive lens element and a negative lens element and that has a positive overall power, and the second sub-group 4b that comprises, in order from the object side, a positive lens element, a negative lens element and a positive lens element and that has a positive overall power. A diaphragm stop 10 can be disposed between sub-groups 4a and 4b.

Each of the lens systems according to the examples satisfies conditions (1) and (2).

Condition (1) relates to the adjustment of backvocus. If the upper limit of this condition is exceeded, the backfocus will change by only a small amount in response to the movement of the sub-group 4b and, therefore, the amount of backfocus to be adjusted increases, necessitating the use of a bulky mechanism of adjustment. If the lower limit of condition (1) is not reached, the backfocus will change by a large amount but, at the same time, aberrations will increase to such an extent that they are difficult to correct effectively. This problem is particularly noticeable when the backfocus is adjusted. In addition, rays of light will emerge from the sub-group 4a almost parallel to the optical axis, so if a ND filter or some other filter is provided in front of the sub-group 4b, the reflected light from the sub-group 4b and subsequent components will undergo another reflection by the filter to be incident again on the image plane, thereby increasing the chance of the occurence of ghosts or flare.

Condition (2) specifies the power of the sub-group 4a and 4b and it must be satisfied in order to attain a power balance in the fourth lens group. By setting the sub-group 4a to have greater power than the sub-group 4b in such a way as to satisfy condition (2), the spherical aberration and astigmatism can be corrected in a balanced way and, at the same time, defocusing due to variations in the spherical aberration can be effectively corrected. In the upper limit of condition (2) is exceeded, the power of the sub-group 4a becomes unduly small or, alternatively, the power of the sub-group 4b becomes excessive; in either case, increased aberrations will develop on account of the movement of the sub-group 4b for focus adjustment. If the lower limit of condition (2) is not reached, the power of the sub-group 4a becomes excessive, making it difficult to effectively correct the spherical aberration and astigmatism that develop during zooming.

The lens systems of the examples further satisfy the following conditions (3) to (5):

$$0.90 < f4b/f4p < 1.50 \quad (3)$$

$$-2.10 < f4b/f4n < -1.20 \quad (4)$$

$$1.00 - \Sigma I4b < 5.00 \quad (5)$$

where f4p: the focal length of the positive first lens element in the sub-group 4b;

f4n; the focal length of the negative second lens element in the sub-group 4b;

m: the lateral magnification of the sub-group 4b; and $\Sigma I4b$: the sum of the spherical aberration coefficients of sub-group 4b.

Conditions (3) and (4) relate to the power distribution in the sub-group 4b and they must be satisified in order to insure that the aberrations that develop when the sub-group 4b is moved for focus adjustment are effectively suppressed to reduce the possible deterioration in performance.

If the upper limit of condition (3) is exceeded, both the positive power of the first lens element in sub-group 4band the negative power of the second lens element in the same sub-group 4b become excessive and higher-order aberrations will develop. If the lower limit of condition (3) is not reached, the effectiveness of providing a positive element as the first lens of the sub-group 4b is reduced whereas the positive power to be borne by the sub-group 4a becomes excessive.

If the upper limit of condition (4) is exceeded, the aberrations that develop in the positive sub-group 4a and in the positive first lens element in the sub-group 4b cannot be effectively corrected. If the lower limit of condition (4) is not reached, those aberrations will be overcorrected.

Condition (5) should be satisfied in order to insure that the changes in focus and spherical aberration due to the change in the thickness of a filter can be corrected simultaneously by moving the sub-group 4b. If the upper limit of this condition is exceeded, the spherical aberration is overcorrected. If the lower limit of condition (5) is not reached, the spherical aberration is undercorrected.

The coefficients of spherical aberration that are listed below are the values that are obtained when the focal length of the overall system at the wide-angle end is calculated as unity.

EXAMPLE 1

FIG. 1 shows the zoom lens system according to Example 1 of the present invention. Specific numerical data for this system are given in Tables 1 and 2, in which r denotes the radius of curvature of an individual lens surface, d the lens thickness or the airspace between lens surfaces, N the refractive index at the d-line, $\nu$ the Abbe number, f the focal length at the d-line (588 nm), fB the backfocus, FNo. the F number, $\omega$ the half view angle.

Figure 2:
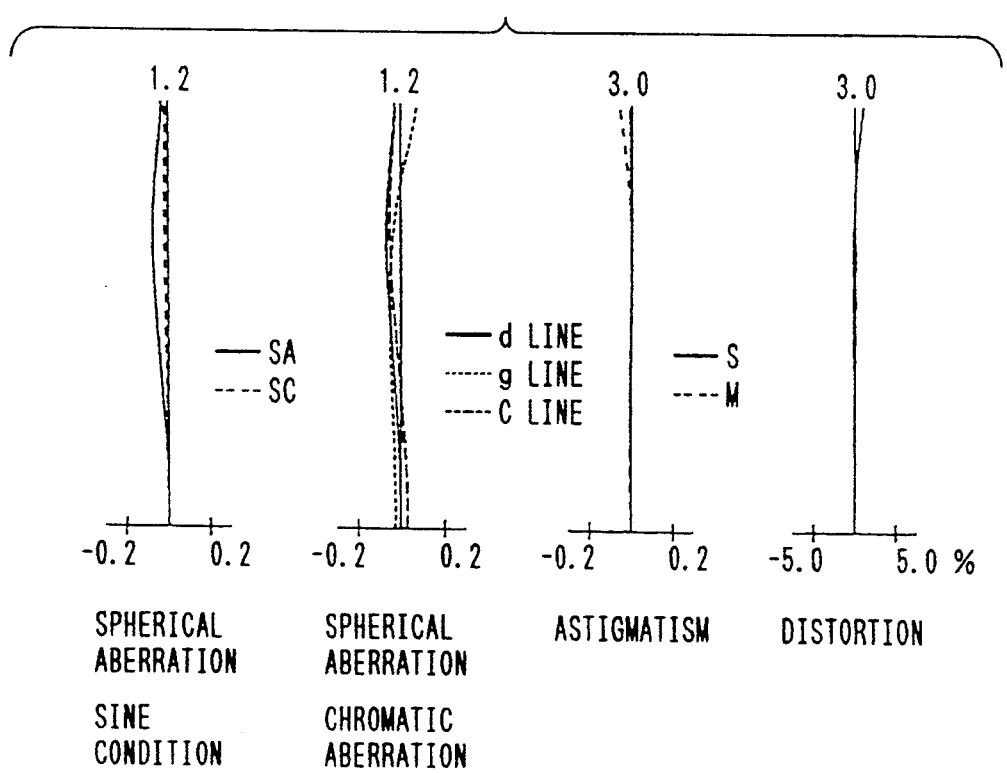
FIG. 2 is a set of graphs plotting the aberration curves obtained with the zoom lens system of Example 1 at the wide-angle end.
Figure 3:
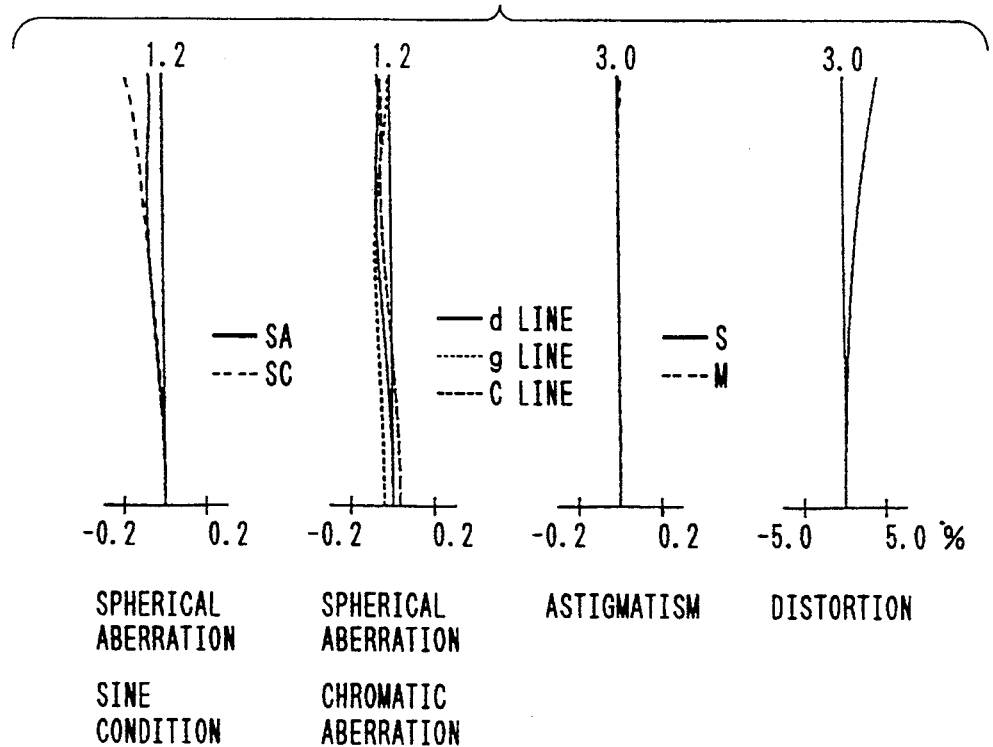
FIG. 3 is a set of graphs plotting the aberration curves obtained with the zoom lens system of Example 1 at the middle-angle end.
Figure 4:
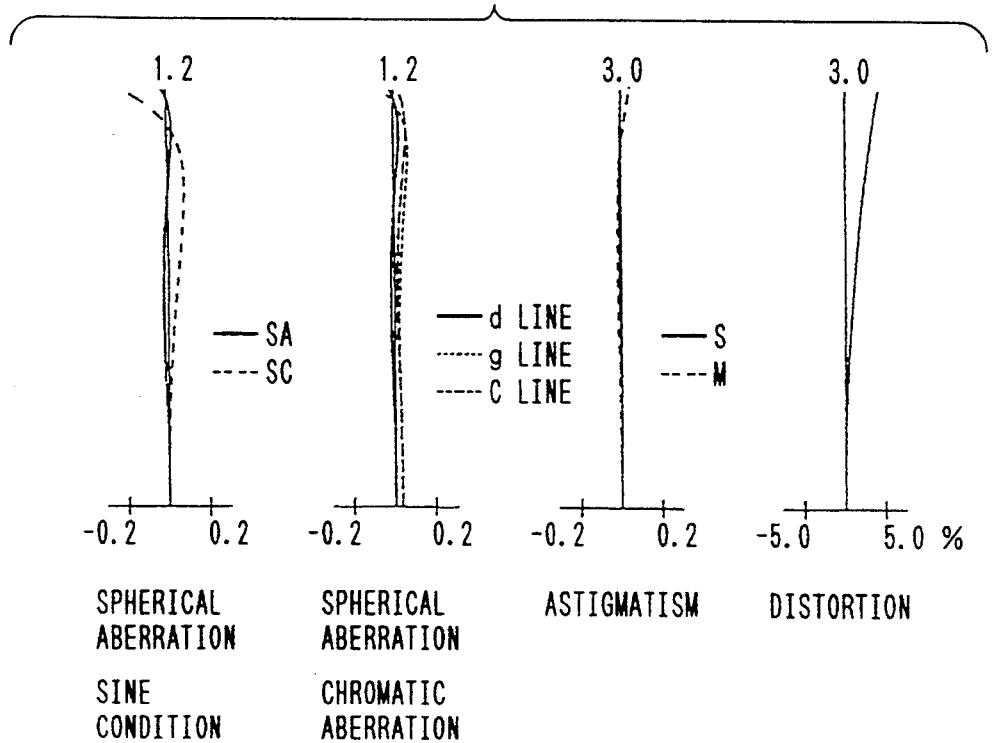
FIG. 4 is a set of graphs plotting the aberration curves obtained with the zoom lens system of Example 1 at the telephoto end.

FIGS. 2, 3, and 4 are graphs plotting the aberration curves obtained with the zoom lens system of Example 1 at the wide-angle end, the middle-angle end and the telephoto end, respectively.

TABLE 1

| Surface No. | r | d | n | $\nu$ |
|---|---|---|---|---|
| 1 | 57.369 | 1.30 | 1.84666 | 23.8 |
| 2 | 28.678 | 5.04 | 1.60311 | 60.7 |
| 3 | −229.660 | 0.10 | | |
| 4 | 23.038 | 3.68 | 1.69680 | 55.5 |
| 5 | 63.854 | variable | | |

TABLE 1-continued

| Surface No. | r | d | n | v |
|---|---|---|---|---|
| 6 | 43.420 | 1.00 | 1.80400 | 46.6 |
| 7 | 7.099 | 3.80 | | |
| 8 | −18.601 | 1.00 | 1.77250 | 49.6 |
| 9 | 34.672 | 0.10 | | |
| 10 | 16.838 | 2.31 | 1.84666 | 23.8 |
| 11 | −205.737 | variable | | |
| 12 | −20.181 | 1.00 | 1.60000 | 56.7 |
| 13 | 247.278 | variable | | |
| 14 | ∞ | 3.35 | 1.77250 | 49.6 |
| 15 | −15.386 | 0.10 | | |
| 16 | 16.280 | 2.38 | 1.77250 | 49.6 |
| 17 | −243.152 | 1.52 | | |
| 18 | −17.512 | 1.00 | 1.84666 | 23.8 |
| 19 | −108.580 | 1.20 | | |
| 20 | ∞ | 0.50 | 1.51633 | 64.1 |
| 21 | ∞ | 4.57 | | |
| 22 | 18.667 | 2.09 | 1.77000 | 43.5 |
| 23 | −34.751 | 0.10 | | |
| 24 | 29.852 | 0.80 | 1.84666 | 23.8 |
| 25 | 7.512 | 1.11 | | |
| 26 | 15.462 | 1.55 | 1.77250 | 49.6 |
| 27 | −43.592 | 1.90 | | |
| 28 | ∞ | 4.70 | 1.51633 | 64.1 |
| 29 | ∞ | | | |

TABLE 2

| f | 6.20 | 15.00 | 36.00 |
|---|---|---|---|
| fB | 4.49 | 4.49 | 4.49 |
| FNo. | 1:1.2 | 1:1.2 | 1:1.2 |
| ω | 25.6° | 10.9° | 4.6° |
| d5 | 0.80 | 11.54 | 17.78 |
| d11 | 16.97 | 4.36 | 2.21 |
| d13 | 3.94 | 5.41 | 1.32 |

The following is a brief description of focus adjustment, in which the lateral magnification of the sub-group 4b is written as m, the distance between the sub-groups 4a and 4b as $\Delta ab$, and the amount of focus shift as $\Delta p$.

In the zoom lens systems of the examples, a filter serving as a plane parallel plate (defined by surfaces 20 and 21) is provided between sub-groups 4a and 4b. It should be noted that this filter does not belong to any of the lens groups and that, therefore, the distance between sub-groups 4a and 4b shall be expressed by d19+d20+d21.

The focus shift due to the movement of the sub-group 4b is expressed by:

$$\Delta ab = \Delta p / (1 - m^2).$$

Figure 5:
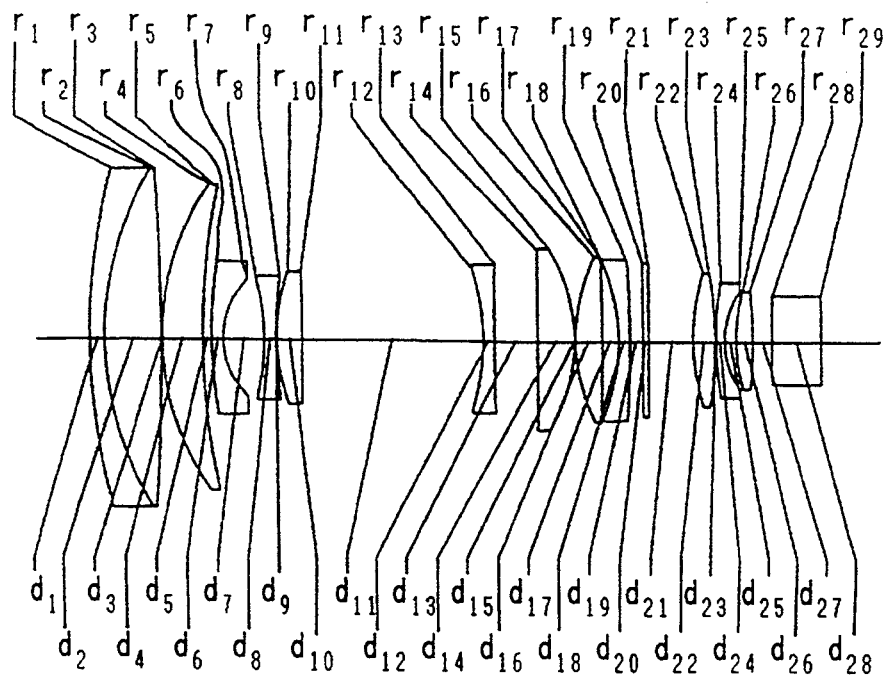
FIG. 5 is a simplified cross-sectional view showing a zoom lens system at the wide-angle end that is adapted from the system of Example 1 by shortening the distance between the sub-groups 4a and 4b by 0.5 mm.

Take, for example, the case where the position in which the imaging plane is mounted is brought closer to the lens system than the design value by 0.41 mm. If m=0.43, then $\Delta ab = -0.5$. In other words, if d21 is reduced by 0.5 mm to 4.07 mm as shown in FIG. 5, TL or the distance from the first lens surface to the imaging plane is reduced from 72.00 mm to 71.59 mm, thereby permitting a focus adjustment of −0.41 mm.

Figure 6:
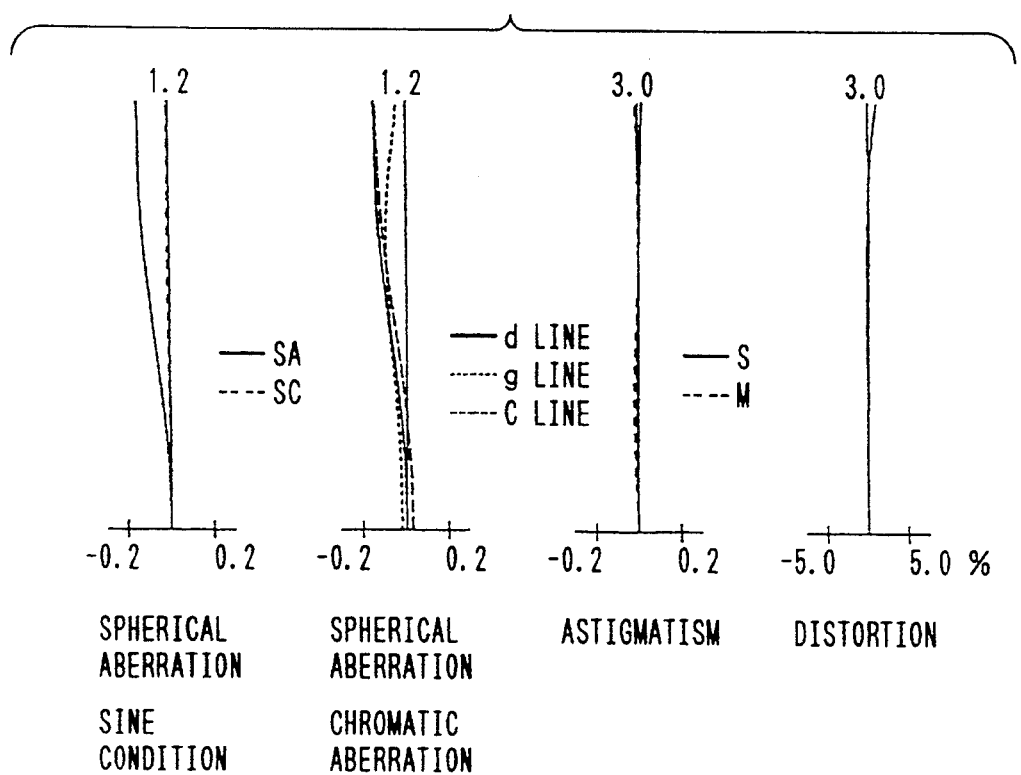
FIG. 6 is a set of graphs plotting the aberration curves obtained with the zoom lens system of FIG. 5 at the wide-angle end.

FIG. 6, 7 and 8 are graphs plotting the aberration curves obtained with the zoom lens system of Example 1 at the wide-angle end, the middle-angle end and the telephoto end, respectively, after it was focus-adjusted.

If the refractive index of the plane parallel plate defined by the 28th and 29th surfaces in front of the imaging plane is written as n and the amount of the change in thickness d28 as $\Delta t$, the following relation holds:

$$\Delta ab = -(1 - n^{-1})\Delta t / (1 - m^2).$$

Figure 9:
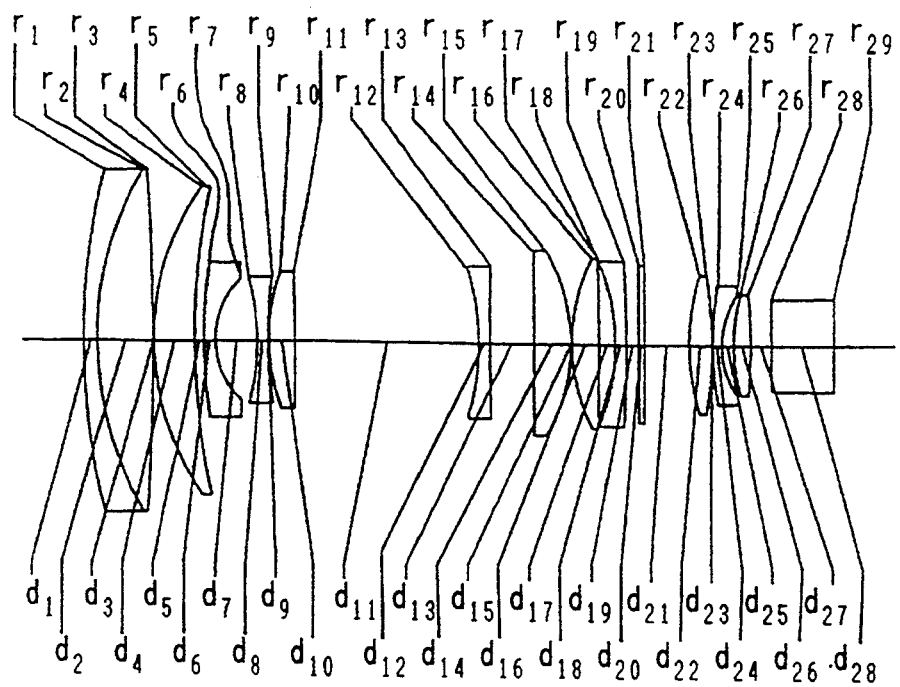
FIG. 9 is a simplified cross-sectional view showing a zoom lens system at the wide-angle end that is adapted from the system of Example 1 by making 1.0 mm thicker the plans parallel plate located the closest to the image, with the resulting focus shift being corrected by shortening the distance between the sub-groups 4a and 4b.

Take, for example, the case where this plane parallel plate is exchanged for a thicker plate with the value of d28 increasing by 1 mm to 5.70 mm. Then, $\Delta ab = -0.42$. In other words, if d21 is reduced by 0.42 mm to 4.15 mm as shown in FIG. 9, TL becomes fixed at 72.00 mm, thereby making it possible to correct the focus shift that occurs in response to the change in thickness of the plane parallel plate.

Figure 10:
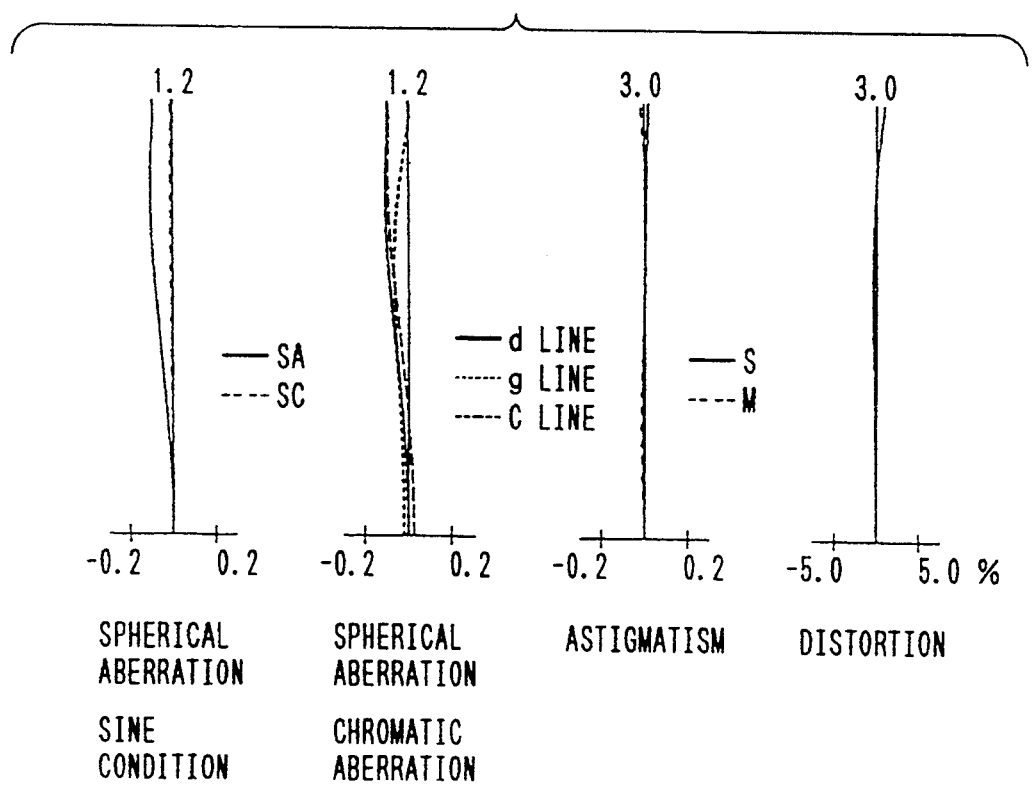
FIG. 10 is a set of graphs plotting the aberration curves obtained with the zoom lens system of FIG. 9 at the wide-angle end.
Figure 11:
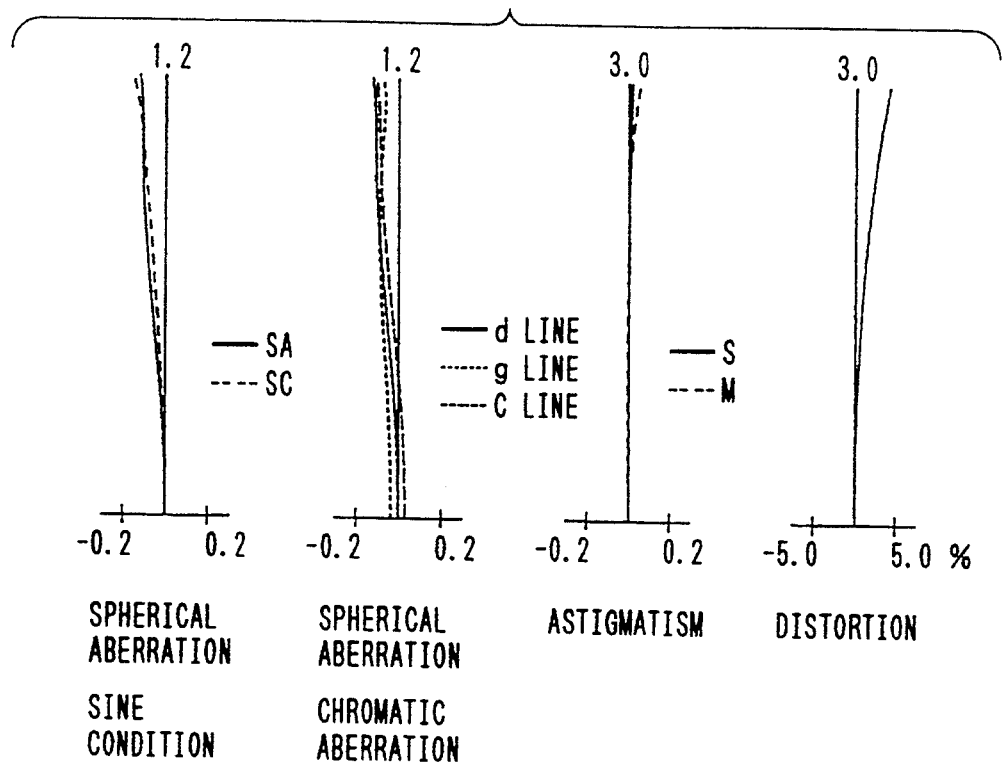
FIG. 11 is a set of graphs plotting the aberration curves obtained with the zoom lens system of FIG. 9 at the meddle-angle end.
Figure 12:
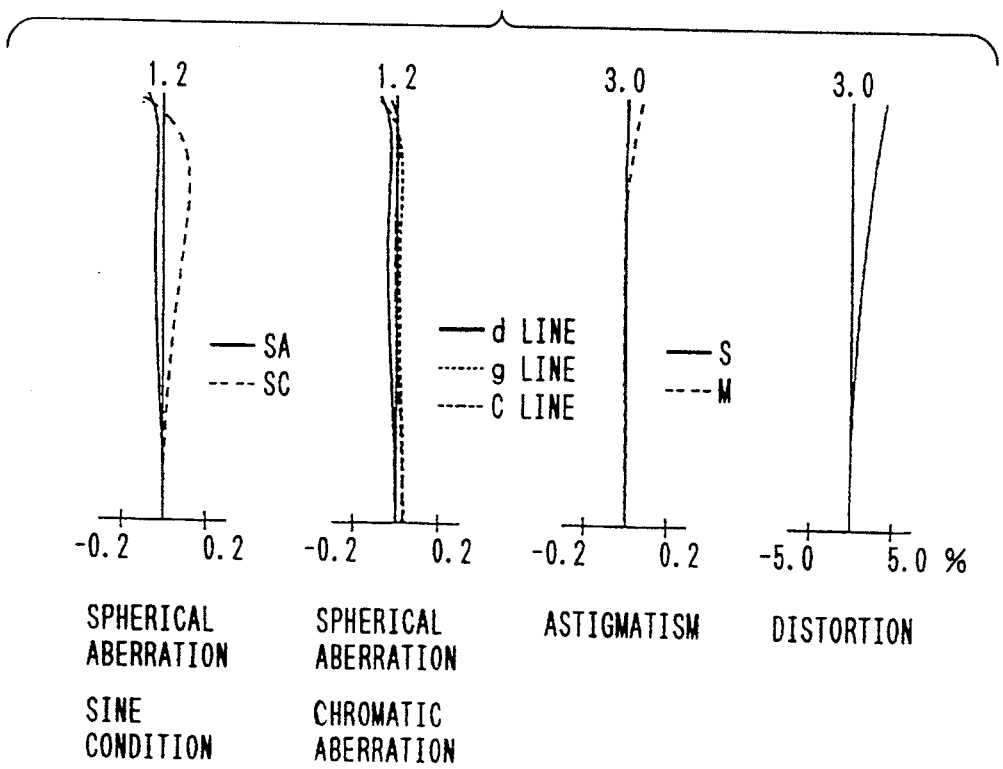
FIG. 12 is a set of graphs plotting the aberration curves obtained with the zoom lens system of FIG. 9 at the telephoto end.

FIGS. 10, 11 and 12 are graphs plotting the aberration curves obtained with the zoom lens system of Example 1 at the wide-angle end, the middle-angle end and the telephoto end, respectively, after it was corrected for focus shift.

If the thickness of filters increases, the spherical aberration that develops in a large-aperture lens system will theoretically change in a plus direction. Therefore, the aforementioned condition (5) is desirably satisfied to insure that the spherical aberration will change in a minus direction when the distance between lens groups $\Delta ab$ is reduced.

EXAMPLE 2

Figure 13:
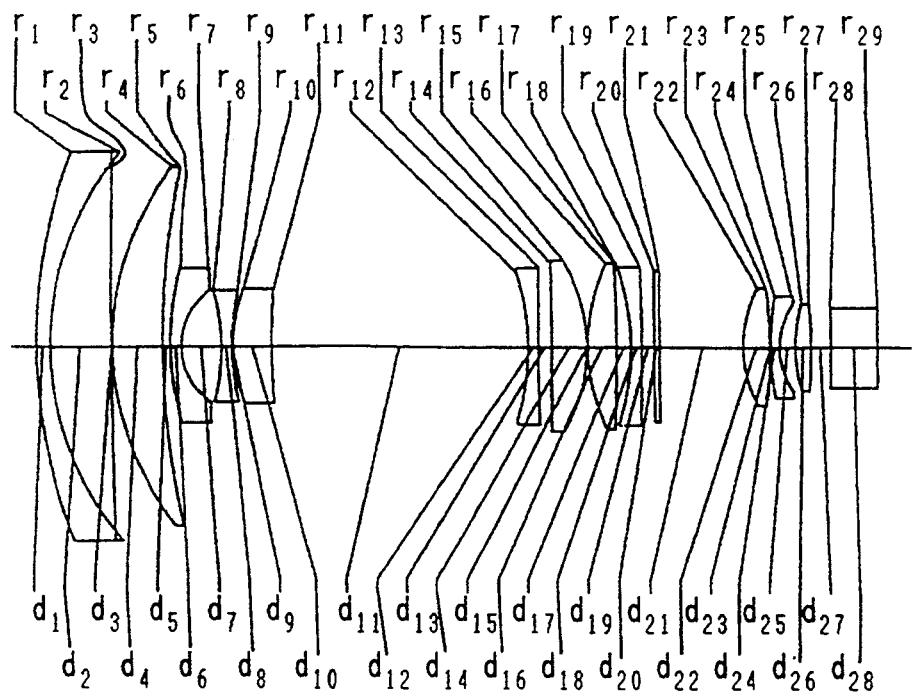
FIG. 13 is a simplified cross-sectional view showing the zoom lens system of Example 2 at the wide-angle end.
Figure 14:
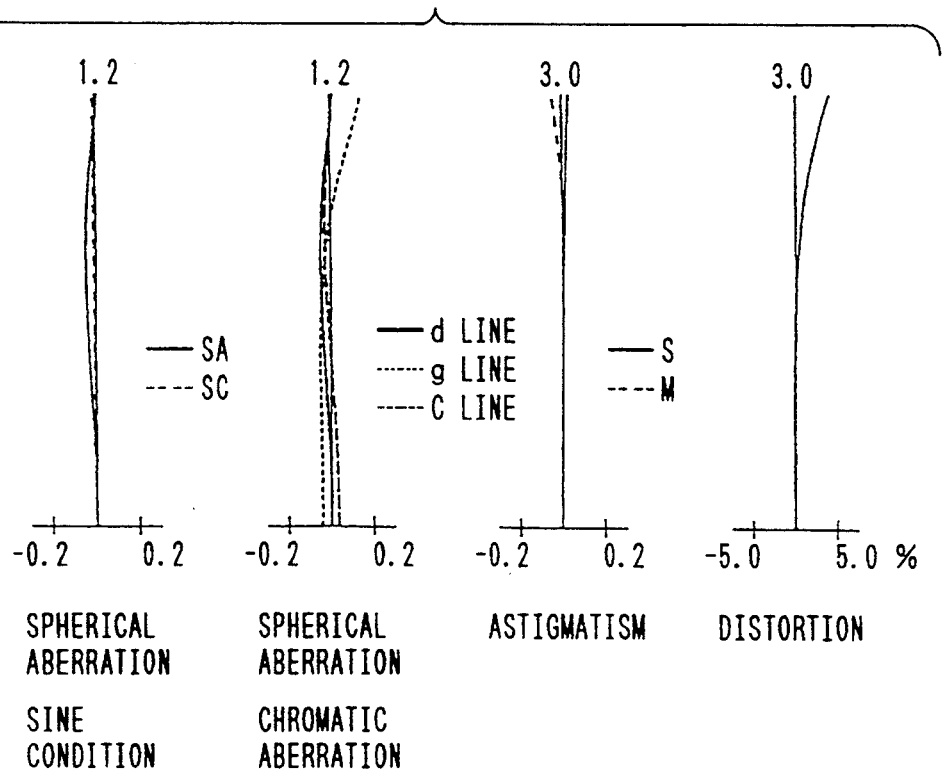
FIG. 14 is a set of graphs plotting the aberration curves obtained with the zoom lens system of Example 2 at the wide-angle end.
Figure 15:
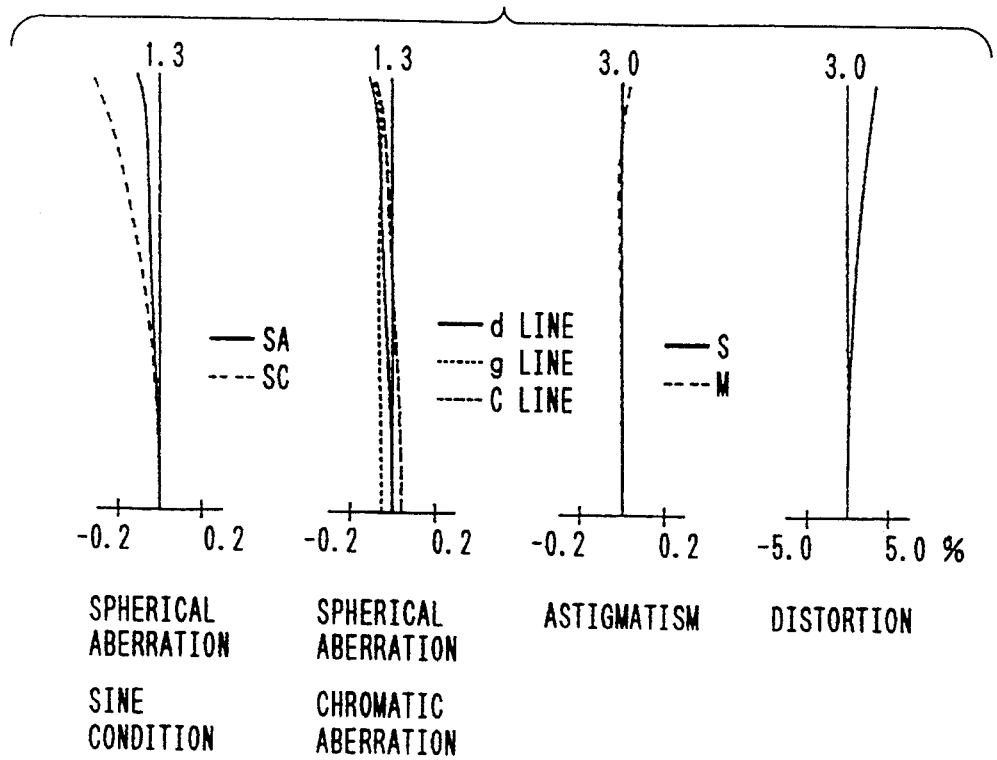
FIG. 15 is a set of graphs plotting the aberration curves obtained with the zoom lens system of Example 2 at the middle-angle end.
Figure 16:
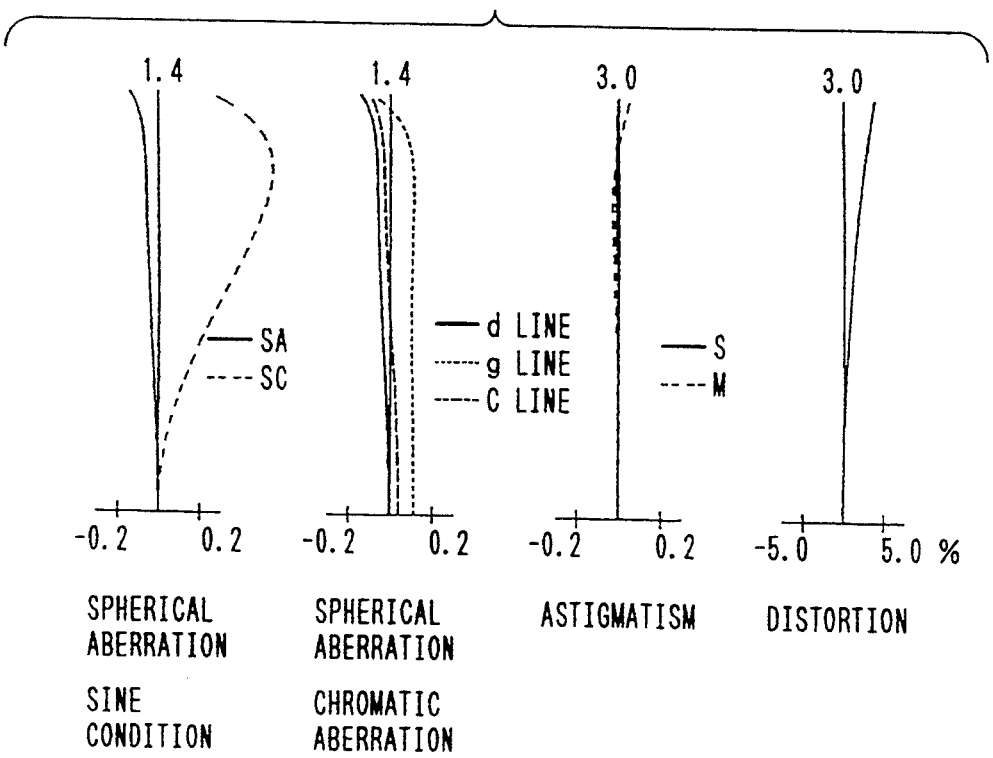
FIG. 16 is a set of graphs plotting the aberration curves obtained with the zoom lens system of Example 2 at the telephoto end.

FIG. 13 shows the zoom lens system according to Example 2 of the present invention. Specific numerical data for this system are given in Tables 3 and 4. FIGS. 14, 15 and 16 are graphs plotting the aberration curves obtained with this system at the wide-angle end, the middle-angle end and the telephoto end, respectively.

TABLE 3

| Surface No. | r | d | n | v |
|---|---|---|---|---|
| 1 | 48.256 | 1.30 | 1.84666 | 23.8 |
| 2 | 27.396 | 5.89 | 1.60311 | 60.7 |
| 3 | 669.507 | 0.10 | | |
| 4 | 26.958 | 4.75 | 1.69680 | 55.5 |
| 5 | 75.727 | variable | | |
| 6 | 27.699 | 1.00 | 1.80400 | 46.6 |
| 7 | 6.482 | 3.84 | | |
| 8 | −19.950 | 1.00 | 1.77250 | 49.6 |
| 9 | 23.984 | 0.10 | | |
| 10 | 14.127 | 3.70 | 1.84666 | 23.8 |
| 11 | 68.467 | variable | | |
| 12 | −21.916 | 1.00 | 1.60397 | 56.3 |
| 13 | 335.735 | variable | | |
| 14 | −453.143 | 3.35 | 1.77250 | 49.6 |
| 15 | −15.461 | 0.10 | | |
| 16 | 18.349 | 2.70 | 1.77250 | 49.6 |
| 17 | −156.922 | 1.42 | | |
| 18 | −22.627 | 1.00 | 1.84666 | 23.8 |
| 19 | −146.286 | 1.20 | | |
| 20 | ∞ | 0.50 | 1.51633 | 64.1 |
| 21 | ∞ | 8.30 | | |
| 22 | 11.599 | 2.60 | 1.53818 | 47.8 |
| 23 | −47.134 | 0.10 | | |
| 24 | 30.517 | 0.80 | 1.84666 | 23.8 |
| 25 | 7.243 | 1.55 | | |
| 26 | 13.972 | 1.51 | 1.77250 | 49.6 |
| 27 | −45.354 | 1.90 | | |
| 28 | ∞ | 4.70 | 1.51633 | 64.1 |
| 29 | ∞ | | | |

TABLE 4

| f | 5.50 | 23.00 | 51.00 |
|---|---|---|---|
| fB | 4.00 | 4.00 | 4.00 |
| FNo. | 1:1.2 | 1:1.3 | 1:1.4 |
| ω | 27.7° | 7.2° | 3.2° |
| d5 | 0.80 | 18.12 | 22.83 |
| d11 | 25.01 | 3.75 | 2.73 |
| d13 | 1.34 | 5.27 | 1.59 |

Figure 17:
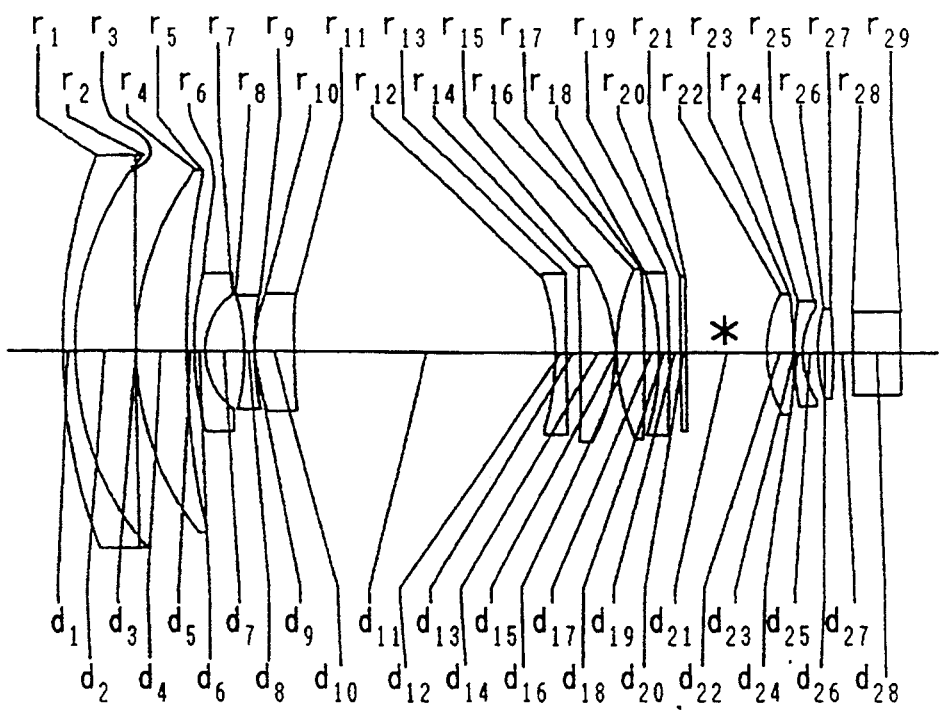
FIG. 17 is a simplified cross-sectional view showing a zoom lens system at the wide-angle end that is adapted from the system of Example 2 by shortening the distance between the sub-groups 4a and 4b by 0.5 mm.

Take, for example, the case of Example 2 where the position in which the imaging plane is mounted is brought closer to the lens system than the design value by 0.39 mm. If m=0.48, then Δab=—0.5. In other words, if d21 is reduced by 0.5 mm to 7.80 mm as shown in FIG. 17, TL or the distance from the first lens surface to the imaging plane is reduced from 85.55 mm to 85.16 mm, thereby permitting a focus adjustment of −0.39 mm.

Figure 18:
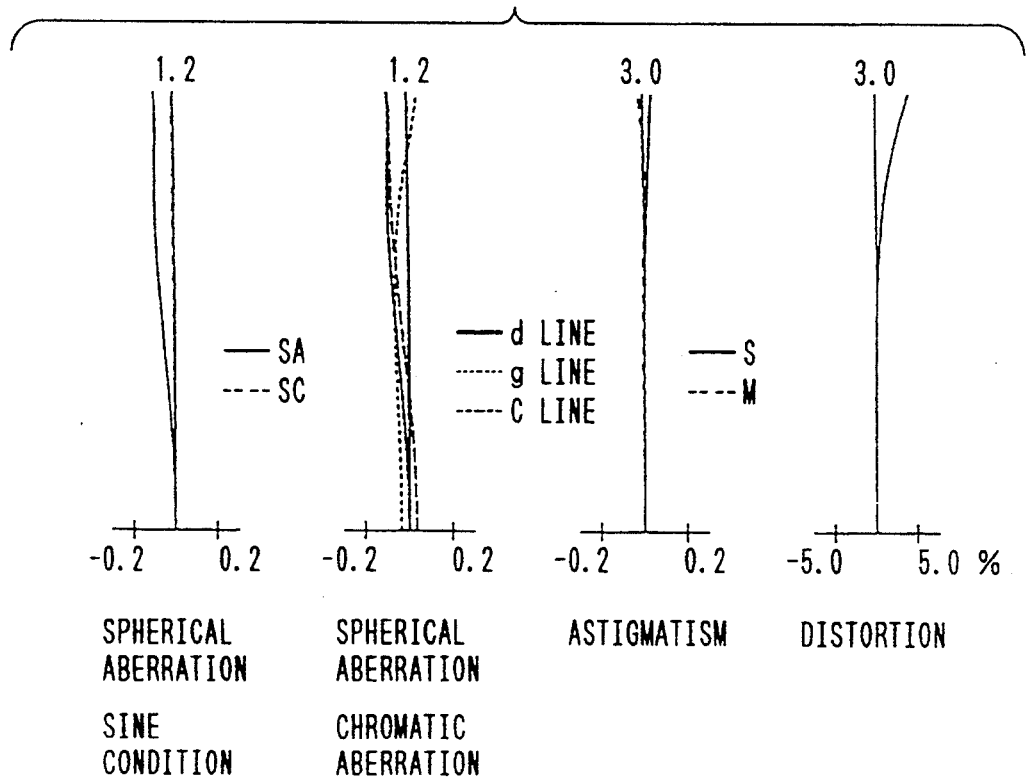
FIG. 18 is a set of graphs plotting the aberration curves obtained with the zoom lens system of FIG. 17 at the wide-angle end.
Figure 19:
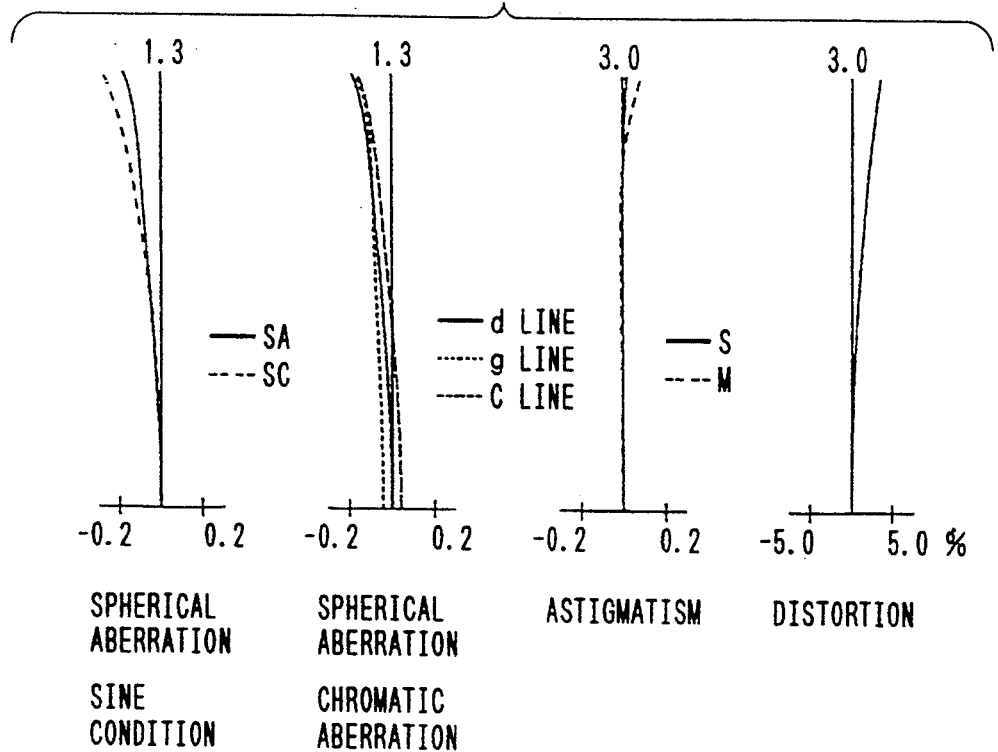
FIG. 19 is a set of graphs plotting the aberration curves obtained with the zoom lens system of FIG. 17 at the middle-angle end.
Figure 20:
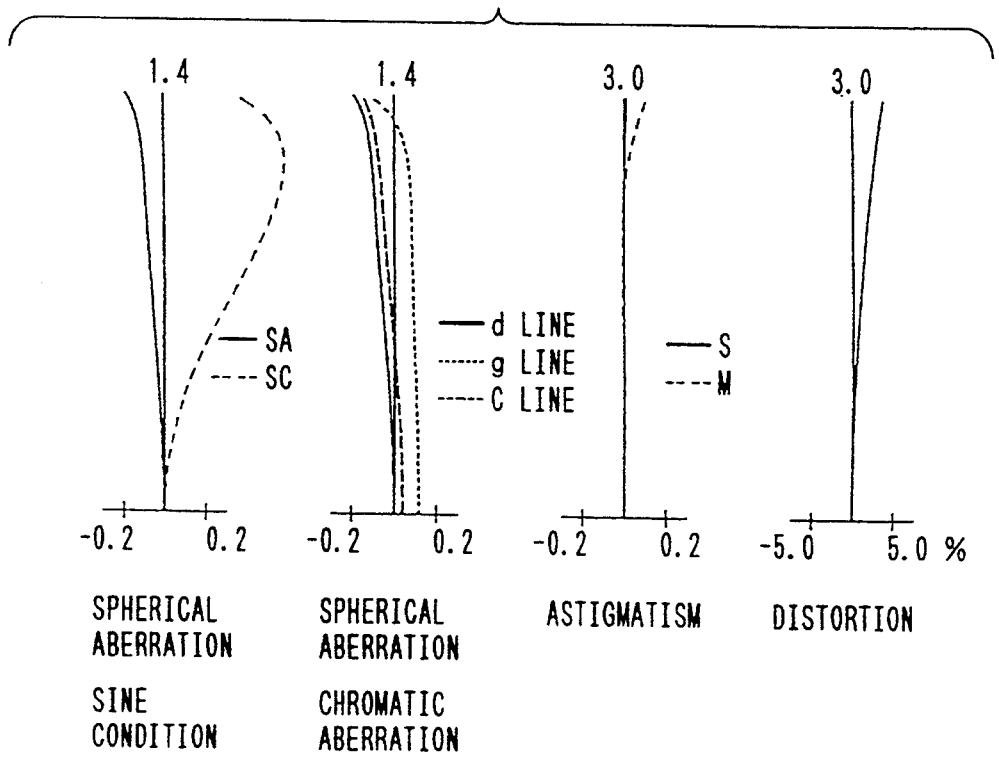
FIG. 20 is a set of graphs plotting the aberration curves obtained with the zoom lens system of FIG. 17 at the telephoto end.

FIGS. 18, 19 and 20 are graphs plotting the aberration curves obtained with the zoom lens system of Example 2 at the wide-angle end, the middle-angle end and the telephoto end, respectively, after it was focus-adjusted.

Figure 21:
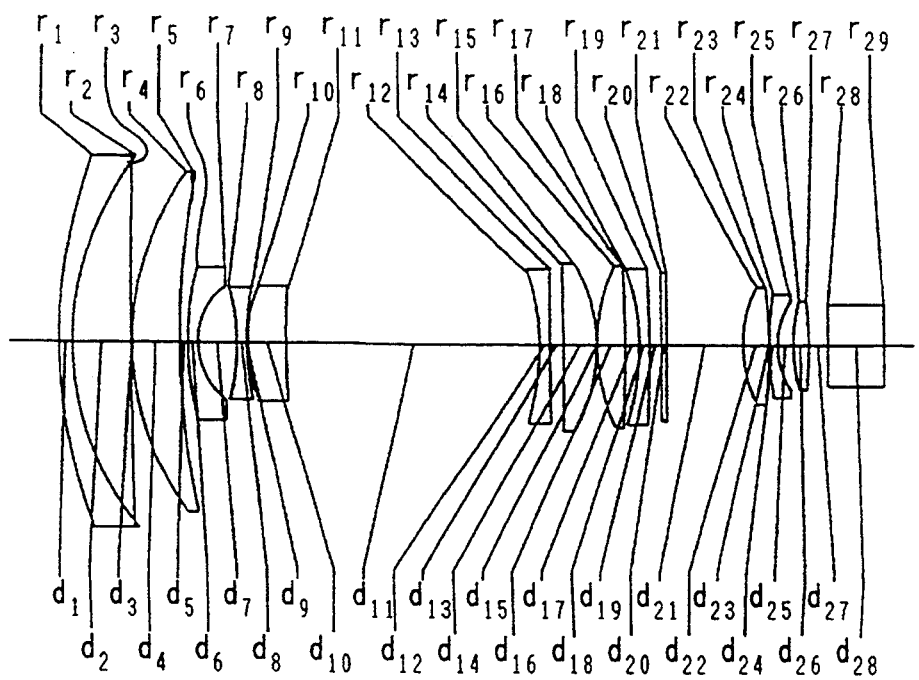
FIG. 21 is a simplified cross-sectional view showing a zoom lens system at the wide-angle end that is adapted from the system of Example 2 by making 1.0 mm thicker the plane parallel plate located the closest to the image, with the resulting focus shift being corrected by shortening the distance between the sub-groups 4a and 4b.

Take, for example, the case where this plane parallel plate defined by the 28th and 29th surfaces in front of the imaging plane is exchanged for a thicker plate with the value of d28 increasing by 1 mm to 5.70 mm. Then, Δab=—0.44. In other words, if d21 is reduced by 0.44 mm to 7.86 mm as shown in FIG. 21, TL becomes fixed at 85.55 mm, thereby making it possible to correct the focus shift that occurs in response to the change in the thickness of the plane parallel plate.

Figure 22:
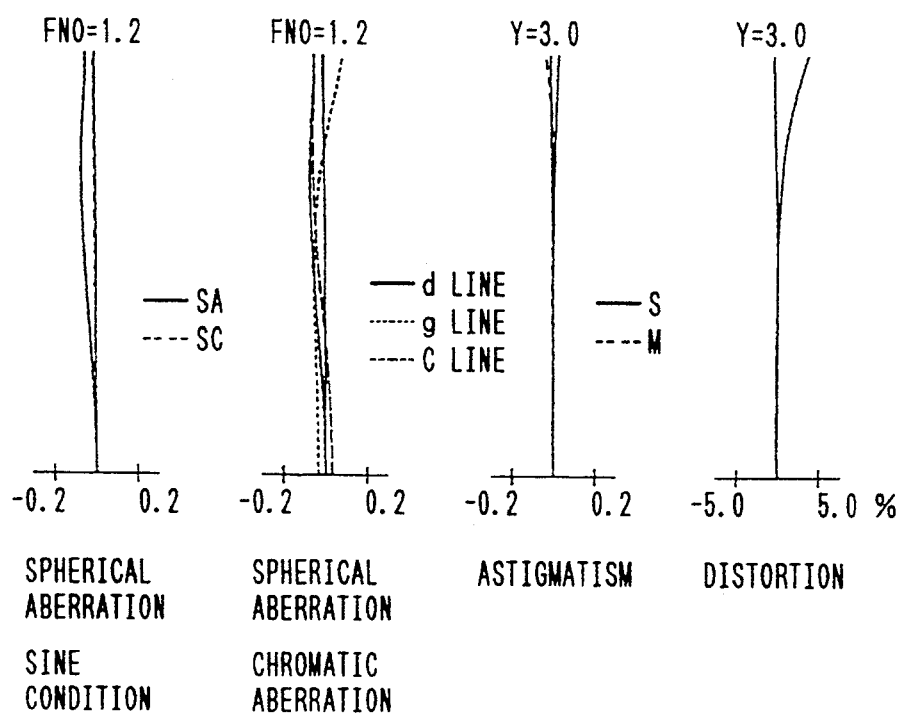
FIG. 22 is a set of graphs plotting the aberration curves obtained with the zoom lens system of FIG. 21 at the wide-angle end.
Figure 23:
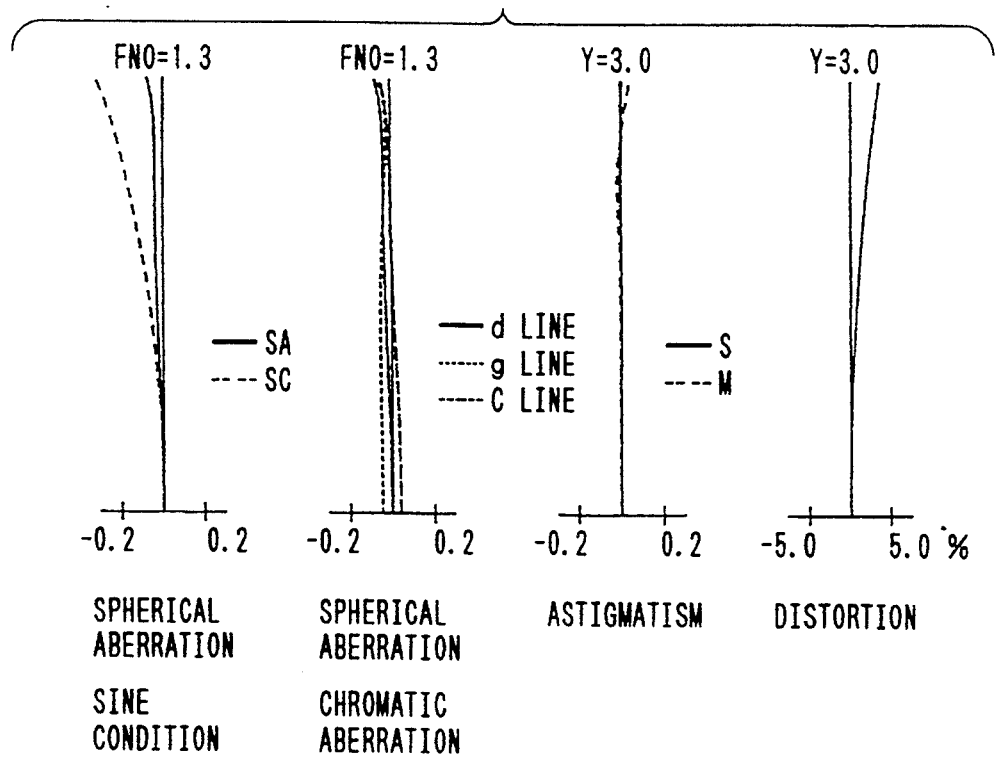
FIG. 23 is a set of graphs plotting the aberration curves obtained with the zoom lens system of FIG. 21 at the middle-angle end.
Figure 24:
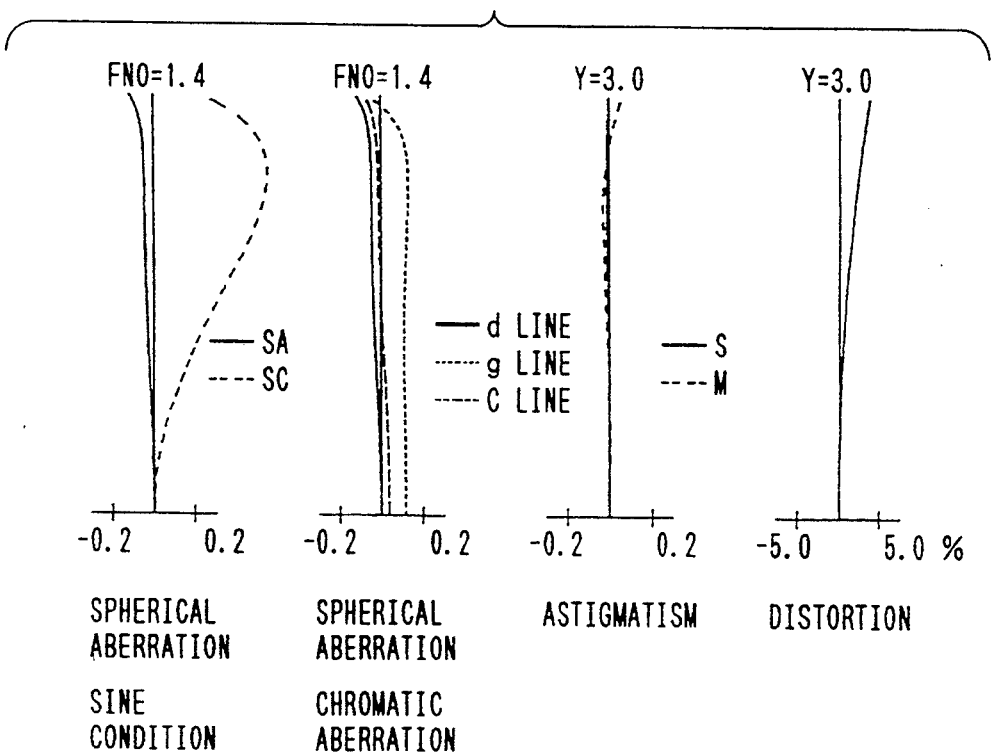
FIG. 24 is a set of graphs plotting the aberration curves obtained with the zoom lens system of FIG. 21 at the telephoto end.

FIGS. 22, 23 and 24 are graphs plotting the aberration curves obtained with the zoom lens system of Example 2 at the wide-angle end, the middle-angle end and the telephoto end, respectively, after it was corrected for focus shift.

Table 5 shows how conditions (1) to (5) are satisfied in Examples 1 and 2.

TABLE 5

| Parameter | Ex. 1 | Ex. 2 |
|---|---|---|
| m | 0.43 | 0.48 |
| f4a/f4b | 0.69 | 0.63 |
| f4b/f4b1 | 1.28 | 1.26 |
| f4b/f4b2 | −1.70 | −1.95 |
| Σ14b | 4.27 | 3.37 |

In each of the zoom lens systems of Examples 1 and 2, a plane parallel plate equivalent to a filter is located at the position of a diaphragm stop between the sub-groups 4a and 4b. However, this plane parallel plate is by no means an essential element for the present invention and a system that does not include such a plane parallel plate is also included within the scope of the present invention.

As described on the foregoing pages, the present invention provides a zoom lens system suitable for use with small television cameras that can be manufactured at low cost, that has a small aperture ratio, that is compact and that has a zoom ratio of ca. 6 to 12.

Further examples of the present invention are described below with reference to the accompanying drawings.

In order to compose the sub-group 4a of three elements that are arranged in the order of a positive, a positive, and a negative element and to insure that aberrations are effectively corrected to such an extent that said sub-group can be used as a large-aperture lens with an F number of ca. 1.2, a positive lens element is preferably used as the first element of the sub-group 4b.

The diaphragm stop for adjusting the quantity of light is provided between the sub-groups 4a and 4b. By providing the diaphragm stop in the fourth lens group at a position comparatively close to the image plane, the stop mechanism can be reduced in size, leading to a lower cost.

Each of the lens systems according to the following examples satisfies conditions (6), (7), (2), (8) and (9).

Condition (6) relates to the power of the fourth lens group. Compared to the conventional four-group type, the fourth lens group in the system of the present invention has a great power to realize compactness. If the lower limit of condition (6) is not reached, the length of the fourth lens group becomes too great to render the overall lens system compact. If the upper limit of condition (6) is exceeded, the power of the fourth lens group becomes excessive and such great aberrations will develop in the fourth lens group that it becomes difficult to correct them with an adequately small number of lens elements.

Conditions (7) and (2) specify the powers of the sub-groups 4a and 4b and they must be satisfied in order to attain a power balance within the fourth lens group having a large power. If the upper limits of these conditions are exceeded, the powers of the sub-groups 4a and 4b become excessive and it is difficult for a small number of lens elements to achieve effective correction of aberrations in such a way that the aperture can be increased to an F number of about 1.2. If the lower limits of conditions (7) and (2) are not reached, the overall lens system cannot be made compact.

By making the power of the sub-group 4a sufficiently greater than that of the sub-group 4b to satisfy condition (2), the fourth lens group can be rendered compact and, at the same time, spherical aberration and astigmatism can be corrected in a balanced way.

Condition (8) specifies the average refractive index of the positive lens elements in the sub-group 4a. If this condition is not met, a desired power cannot be attained with the two positive lens elements unless their radii of curvature are reduced but, then, it is difficult to suppress the spherical aberration to such an extent that those positive elements can be applied to a large-aperture lens having an F number of ca. 1.2. In other words, if condition (8) is not met, the sub-group 4a must be composed of at least three positive lens elements in order to suppress the spherical aberration but this simply results in a failure to meet the requirements for smaller size and lower cost.

Condition (9) relates to the overall lens length of the sub-group 4a. If the upper limit of this condition is exceeded, the use of three elements leads to an excessive lens thickness and a compact system cannot be attained. If the lower limit condition (9) is not reached, the leads thickness must be reduced both in the center and on the periphery but this presents difficulty in lens manufacture.

The lens systems of the examples further satisfy the following conditions (10) to (12):

$$0.12 < L4ab/ft < 0.25 \tag{10}$$

$$0.9 < f4b/fp < 1.5 \tag{11}$$

$$-2.1 < f4b/fn < -1.2 \tag{12}$$

where

L4ab: the distance between sub-groups 4a and 4b;

fp: the focal length of the positive first lens element in the sub-group 4b; and fn: the focal length of the negative second lens element in the sub-group 4b.

Condition (10) specifies the distance between sub-groups 4a and 4b to insure that rays of light emerging from the sub-group 4a will pass through the sub-group 4b to be imaged at an appropriate position. By satisfying this condition, the powers of sub-groups 4a and 4b can be balanced with the aberrations that develop in them and, as a result, the fourth lens group can as a whole be made compact. If the upper limit of condition (10) is exceeded, the overall length of the fourth lens group becomes excessive and it is no longer compact. If the lower limit of condition (10) is not reached, it becomes difficult to correct curvature of the field and distortion.

Conditions (11) and (12) relate to the power distribution in the sub-group 4b. If the upper limit of condition (11) is exceeded, both the positive power of the first lens element in sub-group 4b and the negative power of the second lens element in the same sub-group become excessive and higher-order aberrations will develop. If the lower limit of condition (11) is not reached, the effectiveness of providing a positive element as the first lens of the sub-group 4b is reduced whereas the positive power to be borne by the sub-group 4a becomes excessive. If the upper limit of condition (12) is exceeded, the aberrations that develop in the positive sub-group 4a and in the positive first lens element in the sub-group 4b cannot be effectively corrected. If the lower limit of condition (12) is not reached, those aberrations will be overcorrected.

EXAMPLE 3

Figure 25:
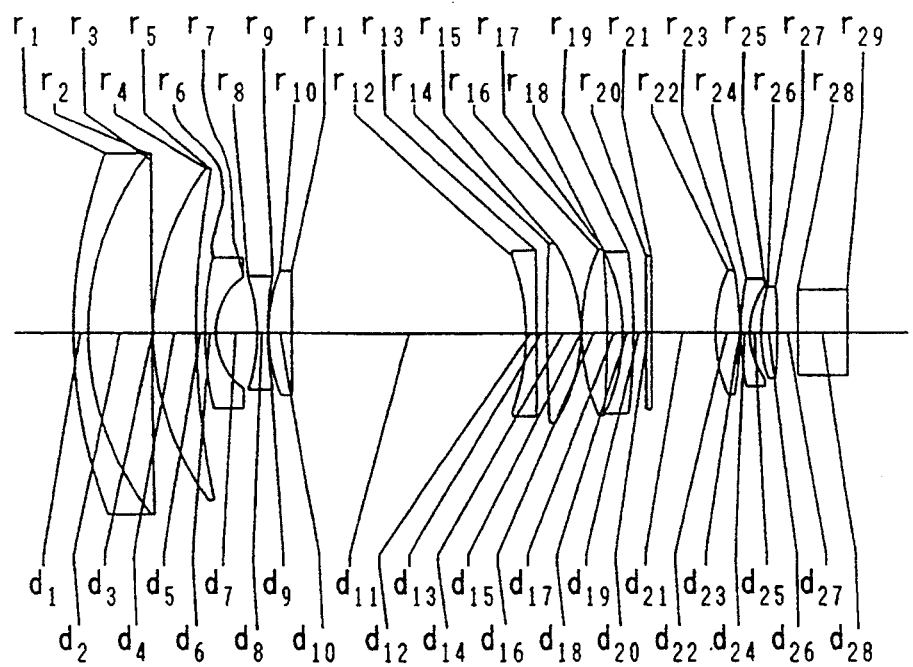
FIG. 25 is a simplified cross-sectional view showing the zoom lens system according to Example 3 at the wide-angle end.
Figure 26:
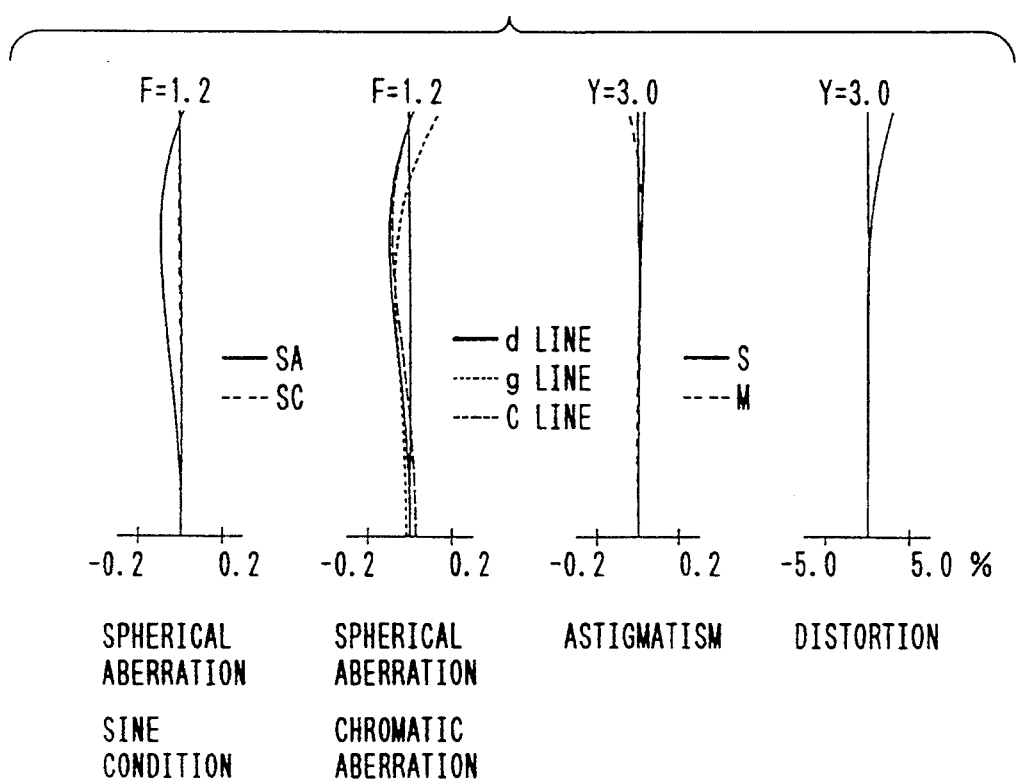
FIG. 26 is a set of graphs plotting the aberration curves obtained with the zoom lens system of Example 3 at the wide-angle end.
Figure 27:
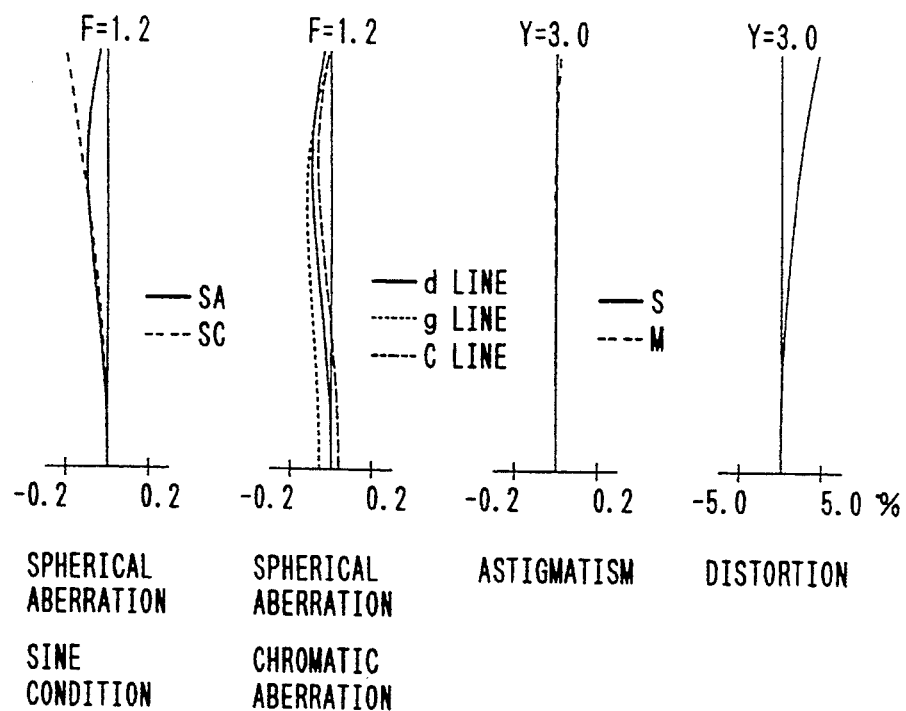
FIG. 27 is a set of graphs plotting the aberration curves obtained with the zoom lens system of Example 3 at the middle-angle end.
Figure 28:
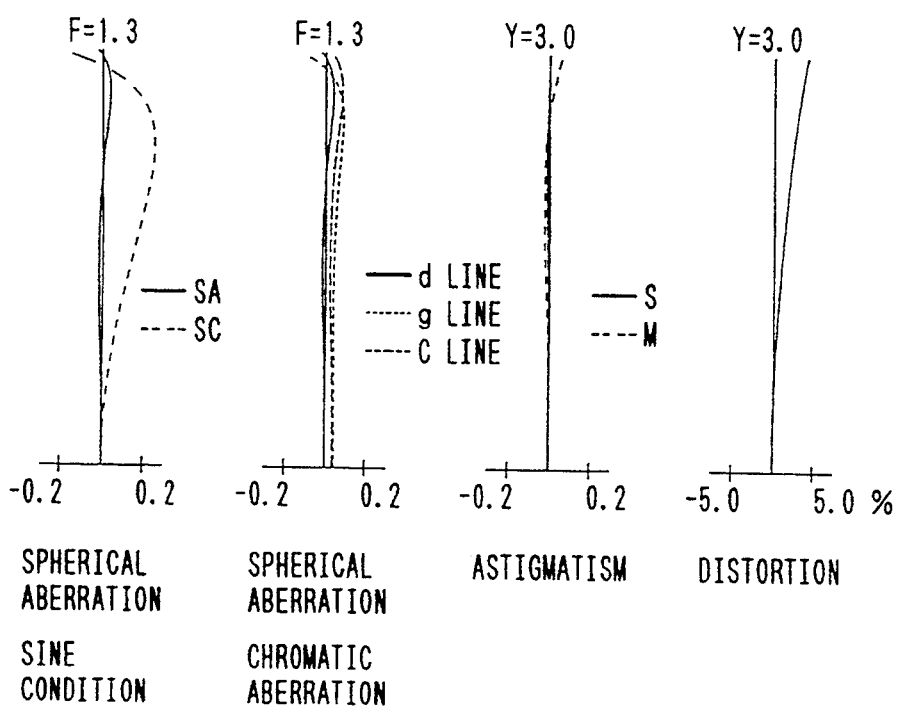
FIG. 28 is a set of graphs plotting the aberration curves obtained with the zoom lens system of Example 3 at the telephoto end.

FIG. 25 shows the zoom lens system according to Example 3 of the present invention. Specific numerical data for this system are given in Tables 6 and 7. FIGS. 26, 27 and 28 are graphs plotting the aberration curves obtained with this system at the wide-angle end, the middle-angle end and the telephoto end, respectively.

TABLE 6

| Surface No. | r | d | n | ν |
|---|---|---|---|---|
| 1 | 46.693 | 1.30 | 1.84666 | 23.8 |
| 2 | 26.447 | 6.02 | 1.60311 | 60.7 |
| 3 | 1420.486 | 0.10 | | |
| 4 | 25.433 | 4.04 | 1.69680 | 55.5 |
| 5 | 74.022 | variable | | |
| 6 | 29.638 | 1.00 | 1.80400 | 46.6 |
| 7 | 6.353 | 3.75 | | |
| 8 | −16.704 | 1.00 | 1.77250 | 49.6 |
| 9 | 26.633 | 0.10 | | |
| 10 | 15.299 | 2.15 | 1.84666 | 23.8 |
| 11 | 883.179 | variable | | |
| 12 | −19.850 | 1.00 | 1.69917 | 48.6 |
| 13 | −1108.433 | variable | | |
| 14 | 161.168 | 3.19 | 1.77250 | 49.6 |
| 15 | −15.089 | 0.10 | | |
| 16 | 18.854 | 2.43 | 1.77250 | 49.6 |
| 17 | −78.142 | 1.39 | | |
| 18 | −17.347 | 1.00 | 1.84666 | 23.8 |
| 19 | −58.098 | 1.20 | | |
| 20 | ∞ | 0.50 | 1.51633 | 64.1 |
| 21 | ∞ | 5.88 | | |
| 22 | 14.395 | 2.25 | 1.56480 | 49.5 |
| 23 | −32.877 | 0.10 | | |
| 24 | 24.407 | 0.80 | 1.84666 | 23.8 |
| 25 | 7.277 | 1.01 | | |
| 26 | 13.957 | 1.50 | 1.77250 | 49.6 |
| 27 | −52.940 | 1.90 | | |
| 28 | ∞ | 4.70 | 1.51633 | 64.1 |
| 29 | ∞ | | | |

TABLE 7

| f | 5.50 | 16.00 | 42.00 |
|---|---|---|---|
| fB | 4.03 | 4.03 | 4.03 |
| FNo. | 1:1.2 | 1:1.2 | 1:1.3 |
| ω | 27.9° | 10.2° | 3.9° |
| d5 | 0.80 | 14.00 | 20.48 |
| d11 | 21.75 | 5.86 | 2.02 |
| d13 | 1.01 | 3.70 | 1.06 |

EXAMPLE 4

Figure 29:
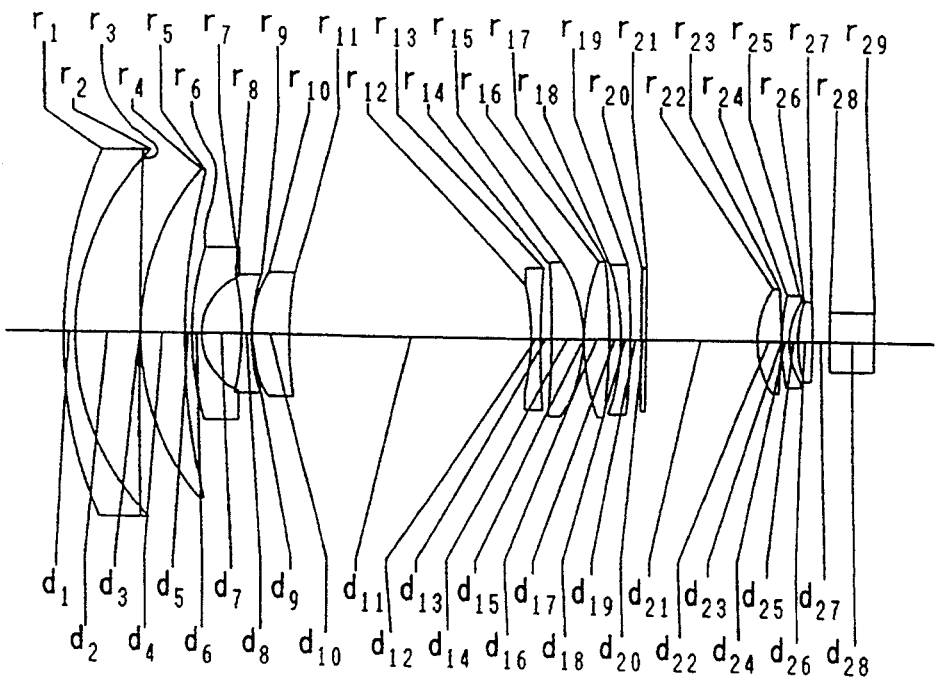
FIG. 29 is a simplified cross-sectional view showing the zoom lens system according to Example 4 at the wide-angle end.
Figure 30:
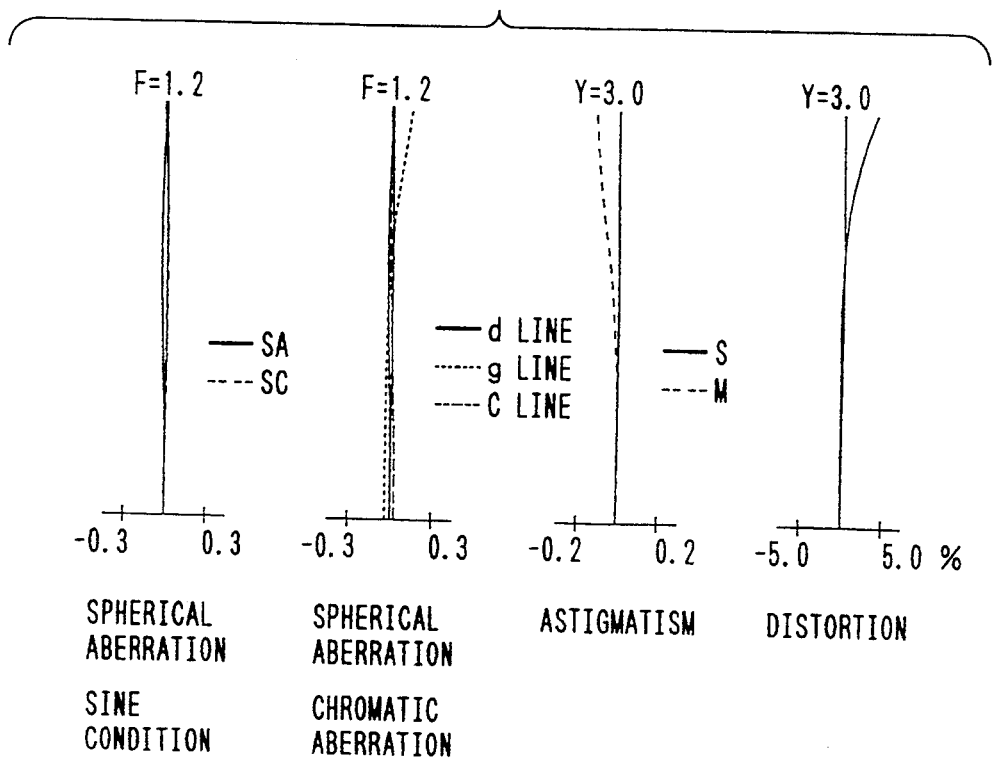
FIG. 30 is a set of graphs plotting the aberration curves obtained with the zoom lens system of Example 4 at the wide-angle end.
Figure 31:
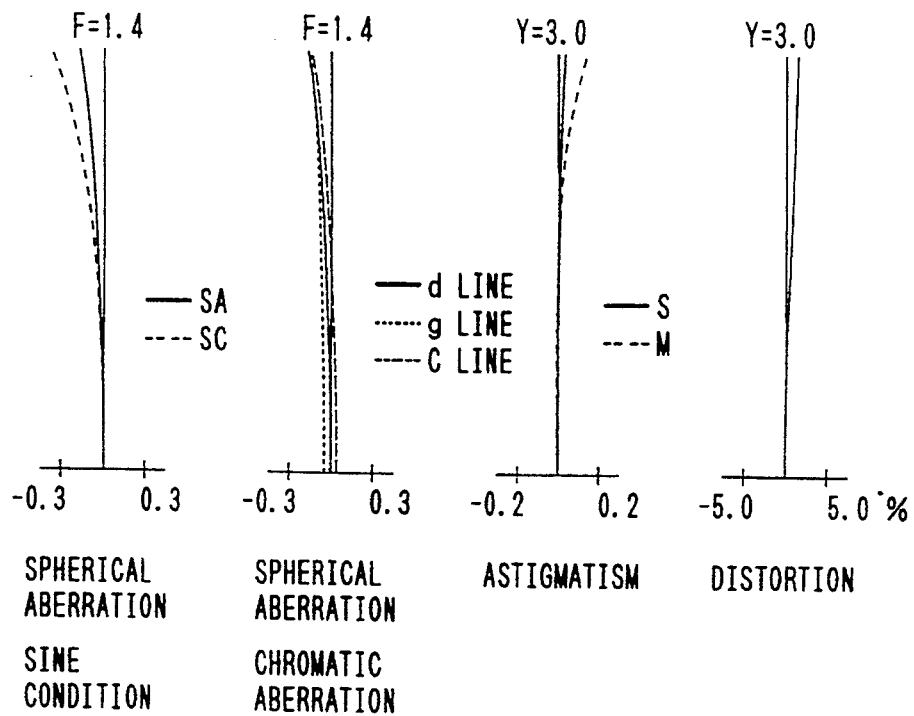
FIG. 31 is a set of graphs plotting the aberration curves obtained with the zoom lens system of Example 4 at the middle-angle end.
Figure 32:
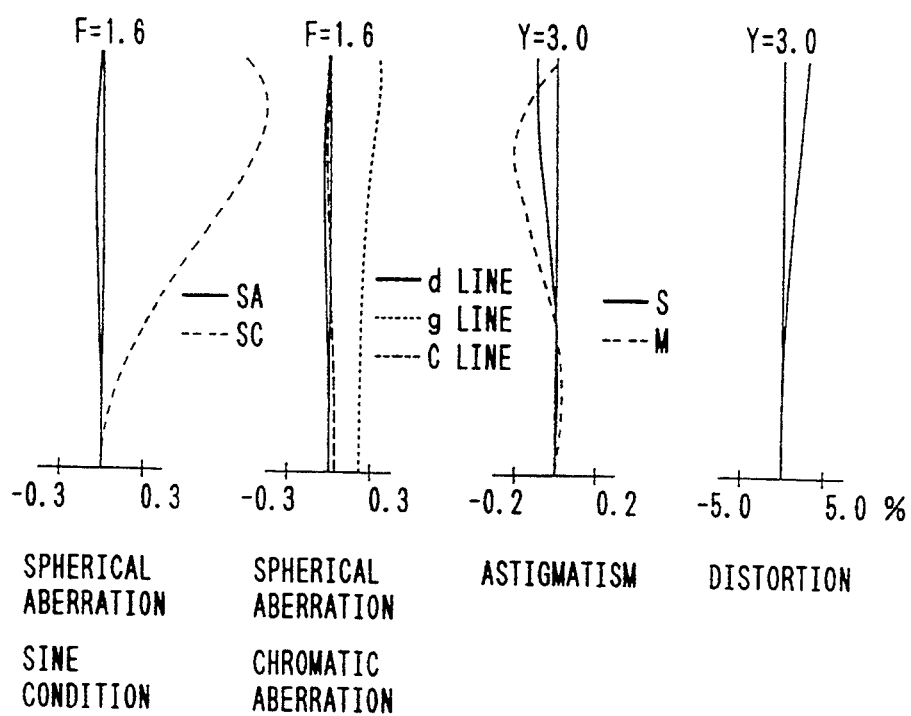
FIG. 32 is a set of graphs plotting the aberration curves obtained with the zoom lens system of Example 4 at the telephoto end.

FIG. 29 shows the zoom lens system according to Example 4 of the present invention. Specific numerical data for this system are given in Tables 8 and 9. FIGS. 30, 31 and 32 are graphs plotting the aberration curves obtained with this system at the wide-angle end, the middle-angle end and the telephoto end, respectively.

TABLE 8

| Surface No. | r | d | n | ν |
|---|---|---|---|---|
| 1 | 47.986 | 1.30 | 1.84666 | 23.8 |
| 2 | 27.127 | 6.83 | 1.60311 | 60.7 |
| 3 | 765.866 | 0.10 | | |
| 4 | 25.850 | 4.81 | 1.69680 | 55.5 |
| 5 | 67.734 | variable | | |
| 6 | 30.071 | 1.00 | 1.80400 | 46.6 |
| 7 | 6.429 | 4.30 | | |
| 8 | −25.071 | 1.00 | 1.77250 | 49.6 |
| 9 | 18.029 | 0.10 | | |
| 10 | 12.833 | 3.86 | 1.84666 | 23.8 |
| 11 | 41.059 | variable | | |
| 12 | −22.846 | 1.00 | 1.62900 | 53.8 |
| 13 | 94.284 | variable | | |
| 14 | −106.893 | 3.35 | 1.77250 | 49.6 |
| 15 | −14.818 | 0.10 | | |
| 16 | 22.964 | 2.73 | 1.77250 | 49.6 |
| 17 | −60.808 | 1.22 | | |
| 18 | −24.397 | 1.00 | 1.84666 | 23.8 |
| 19 | −80.177 | 1.20 | | |
| 20 | ∞ | 0.50 | 1.51633 | 64.1 |
| 21 | ∞ | 11.85 | | |
| 22 | 10.065 | 2.50 | 1.49000 | 69.8 |
| 23 | −75.670 | 0.10 | | |
| 24 | 23.028 | 0.80 | 1.84666 | 23.8 |
| 25 | 7.307 | 1.00 | | |
| 26 | 13.944 | 1.55 | 1.77250 | 49.6 |
| 27 | −70.581 | 1.90 | | |
| 28 | ∞ | 4.70 | 1.51633 | 64.1 |
| 29 | ∞ | | | |

TABLE 9

| f | 5.50 | 23.00 | 60.20 |
|---|---|---|---|
| fB | 4.05 | 4.05 | 4.05 |
| FNo. | 1:1.2 | 1:1.4 | 1:1.6 |
| ω | 29.9° | 7.3° | 2.8° |
| d5 | 0.80 | 18.44 | 23.39 |
| d11 | 25.60 | 4.26 | 3.19 |
| d13 | 1.17 | 4.87 | 0.99 |

Table 9 shows how conditions (2) and (6) to (12) are satisfied in Examples 1 to 4.

TABLE 10

| | | Ex. 1 | Ex. 2 | Ex. 3 | Ex. 4 |
|---|---|---|---|---|---|
| (6) | fM/f4 | 1.15 | 1.05 | 1.17 | 1.00 |
| (7) | f4/f4a | 0.93 | 1.15 | 1.03 | 1.24 |
| (2) | f4a/f4b | 0.69 | 0.63 | 0.59 | 0.63 |
| (8) | N4ap | 1.77 | 1.77 | 1.77 | 1.77 |
| (9) | L4a/fM | 0.56 | 0.51 | 0.53 | 0.48 |
| (10) | L4ab/fT | 0.17 | 0.20 | 0.18 | 0.23 |
| (11) | f4b/fp | 1.28 | 1.27 | 1.18 | 1.20 |
| (12) | f4b/fn | −1.70 | −1.95 | −1.70 | −1.70 |

As described on the foregoing pages, the present invention provides a zoom lens system suitable for use with small television cameras that can be manufactured at low cost, that has a small aperture ratio, that is compact and that has a zoom ratio of about 6 to 12.

What is claimed is:

1. A zoom lens system comprising, in order from the object side, a first lens unit that remains fixed during zooming and which has a positive power, a second lens unit that moves during zooming and that has a negative power, a third lens unit that moves during zooming to compensate for focus error and that has a negative power, and a fourth lens unit that remains fixed during zooming and that has a positive power, said fourth lens unit comprising, in order from the object side, a sub-group 4a having a positive power and a sub-group 4b having a positive power, the focus being adjusted by moving said sub-group 4b along the optical axis and, said zoom lens system together satisfying the following conditions:

$$0.20 < m < 0.70 \quad (1)$$

$$0.40 < f4a/f4b < 0.79 \quad (2)$$

where
m: the lateral magnification of the sub-group 4b;
f4a: the focal length of the sub-group 4a; and
f4b: the focal length of the sub-group 4b.

2. A zoom lens system according to claim 1, wherein said sub-group 4b comprises, in order from the object side, a first positive lens element, a negative lens element and a second positive lens element and satisfies the following conditions:

$$0.90 < f4b/f4p < 1.50 \quad (3)$$

$$-2.10 < 4fb/f4n < -1.20 \quad (4)$$

where
f4p: the focal length of the positive first lens element in the sub-group 4b; and
f4n: the focal length of the negative second lens element in the sub-group 4b.

3. A zoom lens system comprising, in order from the object side, a first lens group that remains fixed during zooming and which has a positive power, a second lens group that moves during zooming and that has a negative power, a third lens group that moves during zooming to compensate for focus error and that has a negative power, and a fourth lens unit that remains fixed during zooming and that has a positive power, said fourth lens group comprising, in order from the object side, a sub-group 4a having a positive power and a sub-group 4b having a positive power, the focus being adjusted by moving said sub-group 4b along the optical axis and, said zoom lens system further satisfying the following conditions:

$$0.20 < m < 0.70 \quad (1)$$

$$1.00 < \Sigma I4b < 5.00 \quad (2)$$

where
m: the lateral magnification of the sub-group 4b; and
$\Sigma I4b$: the sum of spherical aberration coefficients of the sub-group 4b.

4. A zoom lens system comprising, in order from the object side, a first lens unit that remains fixed during zooming and which has a positive power, a second lens unit that moves during zooming and that has a negative power, a third lens unit that moves during zooming to compensate for focus error and that has a negative power, and a fourth lens unit that remains fixed during zooming and that has a positive power, said fourth lens unit comprising a first sub-group 4a that has a positive overall power, and a second sub-group 4b that has a positive overall power, which zoom lens system satisfies the following conditions:

$$0.8 < fM/f4 < 1.4 \quad (6)$$

$$0.75 < f4/f4a < 1.35 \quad (7)$$

$$0.4 < f4a/f4b < 0.79 \quad (2)$$

$$1.715 < N4ap \quad (8)$$

$$0.4 < L4a/fM < 0.65 \quad (9)$$

where $$fM = \sqrt{(fw \cdot ft)} \ ;$$

fw: the focal length of the overall system at the wide-=angle end;
ft: the focal length of the overall system at the telephoto end;
f4: the focal length of the fourth lens group;
f4a: the focal length of the sub-group 4a;
f4b: the focal length of the sub-group 4b;
N4ap: the average refractive index of the positive lens elements in the sub-group 4a; and
L4a: the overall length of the sub-group 4a.

5. A zoom lens system according to claim 4 wherein said first lens group comprises, in order from the object side, a cemented lens composed of a negative lens element that is cemented to a positive meniscus lens element having a convex surface directed toward the object side, and a positive meniscus lens element having a convex surface directed toward the object side.

6. A zoom lens system according to claim 4 wherein said second lens group comprises, in order from the object side, a negative meniscus lens element having a convex surface of small curvature radius directed toward the object side, a biconcave lens element, and a positive lens element spaced from said biconcave lens element.

7. A zoom lens system according to claim 4 wherein said third lens group is composed of a negative lens element having a concave surface directed toward the object side.

8. A zoom lens system according to claim 4 wherein a diaphragm stop for adjusting the quantity of light is provided between said sub-group 4a and said sub-group 4b.

9. A zoom lens system according to claim 4 which further satisfies the following condition:

$$0.12 < L4ab/ft < 0.25 \quad (10)$$

where
L4ab: the distance between sub-group 4a and 4b.

10. A zoom lens system as claimed in claim 4, wherein said sub-group 4a comprises, in order from the object side, a positive lens element, a positive lens element and a negative lens element and said sub-group 4b comprises, in order from the object side, a positive lens element, a negative lens element and a positive lens element.

11. A zoom lens system according to claim 10 which further satisfies the following conditions:

$$0.9 < f4b/fp < 1.5 \quad (11)$$

$$-2.1 < f4b/fn < -1.2 \quad (12)$$

where
- fp: the focal length of the positive first lens element in the sub-group 4b; and
- fn: the focal length of the negative second lens element in the sub-group 4b.

* * * * *

UNITED STATES PATENT AND TRADEMARK OFFICE
CERTIFICATE OF CORRECTION

PATENT NO. : 5,371,630
DATED : December 6, 1994
INVENTOR(S) : Takayuki Ito, et. al.

It is certified that error appears in the above-indentified patent and that said Letters Patent is hereby corrected as shown below:

Title page,

[73] Assignees: Correct the first Assignee from "Asahi Kogaku Kabushiki Kasiha" to --Asahi Kogaku Kogyo Kabushiki Kaisha--.

Signed and Sealed this

Second Day of January, 1996

Attest:

BRUCE LEHMAN

Attesting Officer

Commissioner of Patents and Trademarks